US010375353B2

(12) United States Patent
Sakai et al.

(10) Patent No.: US 10,375,353 B2
(45) Date of Patent: Aug. 6, 2019

(54) INFORMATION PROCESSING APPARATUS, INFORMATION PROCESSING METHOD, AND PROGRAM

(71) Applicant: Sony Corporation, Tokyo (JP)

(72) Inventors: Yusuke Sakai, Kanagawa (JP); Atsushi Izumihara, Kanagawa (JP); Daisuke Miki, Tokyo (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 15/779,181

(22) PCT Filed: Sep. 28, 2016

(86) PCT No.: PCT/JP2016/078617
§ 371 (c)(1),
(2) Date: May 25, 2018

(87) PCT Pub. No.: WO2017/098780
PCT Pub. Date: Jun. 15, 2017

(65) Prior Publication Data

US 2018/0332254 A1 Nov. 15, 2018

(30) Foreign Application Priority Data

Dec. 11, 2015 (JP) ................................ 2015-242437

(51) Int. Cl.
*H04N 7/14* (2006.01)
*G06F 3/0481* (2013.01)
(Continued)

(52) U.S. Cl.
CPC .......... *H04N 7/147* (2013.01); *G06F 3/0481* (2013.01); *H04M 1/00* (2013.01);
(Continued)

(58) Field of Classification Search
CPC ... H04N 7/147; H04N 7/157; H04M 3/42348; H04M 1/00; H04M 11/00; G06F 3/0481
See application file for complete search history.

(56) References Cited

U.S. PATENT DOCUMENTS 8,340,258 B2 * 12/2012 Baker .................... G06Q 10/00 348/14.12
9,794,511 B1 * 10/2017 McQueen ............. H04N 7/142
(Continued)

FOREIGN PATENT DOCUMENTS

JP 2006319818 A 11/2006
JP 4576740 B2 11/2010
(Continued)

OTHER PUBLICATIONS

International Search Report corresponding to PCT/JP2016/078617, dated Jan. 10, 2017, 3 pgs.

*Primary Examiner* — Stella L. Woo
(74) *Attorney, Agent, or Firm* — Lerner, David, Littenberg, Krumholz & Mentlik, LLP

(57) ABSTRACT

To provide an information processing apparatus, an information processing method, and a program capable of producing the distance to a communication partner by using a three-dimensional expression to connect spaces, and realizing more comfortable communication.
An information processing apparatus including: a reception unit configured to receive data from a communication destination; a generation unit configured to generate space image information in which an image corresponding to a space of the communication destination is disposed at a predetermined position in a three-dimensional space; and a display control unit configured to perform control such that the generated space image information is displayed on a display unit in a communication source.

17 Claims, 23 Drawing Sheets

(51) Int. Cl.

| | |
|---|---|
| ***H04M 1/00*** | (2006.01) |
| ***H04M 11/00*** | (2006.01) |
| ***H04M 3/42*** | (2006.01) |
| ***H04N 7/15*** | (2006.01) |

(52) U.S. Cl.
CPC ....... *H04M 3/42348* (2013.01); *H04M 11/00* (2013.01); *H04N 7/157* (2013.01)

(56) References Cited

U.S. PATENT DOCUMENTS

| | | | | |
|---|---|---|---|---|
| 2006/0256118 | A1 | 11/2006 | Kake et al. | |
| 2009/0244256 | A1* | 10/2009 | Wheatley ........... | H04N 5/23203 348/14.08 |
| 2012/0038742 | A1* | 2/2012 | Robinson ............... | H04N 7/142 348/14.16 |
| 2012/0281059 | A1* | 11/2012 | Chou .................. | H04L 12/1827 348/14.07 |
| 2013/0162749 | A1* | 6/2013 | Eskilsson ............... | H04N 7/144 348/14.1 |
| 2013/0329000 | A1* | 12/2013 | Cain ...................... | H04N 7/152 348/14.08 |
| 2014/0098183 | A1* | 4/2014 | Smith .................... | H04N 7/157 348/14.16 |
| 2016/0182854 | A1* | 6/2016 | Suzuki ................... | H04N 7/147 348/14.07 |
| 2017/0142367 | A1* | 5/2017 | Nakano .................... | H04N 7/14 |

FOREIGN PATENT DOCUMENTS

| | | | |
|---|---|---|---|
| JP | 4645355 | B2 | 3/2011 |
| JP | 2014056308 | A | 3/2014 |
| WO | 2011027475 | A1 | 3/2011 |

* cited by examiner

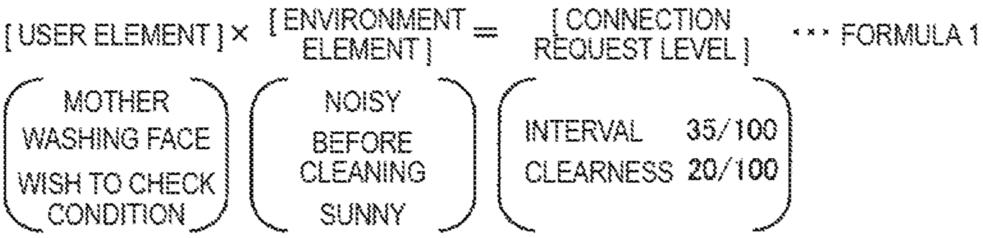

FIG. 4

$$[\text{USER ELEMENT}] \times [\text{ENVIRONMENT ELEMENT}] = [\text{CONNECTION REQUEST LEVEL}] \quad \cdots \text{FORMULA 1}$$

$$\begin{pmatrix} \text{MOTHER} \\ \text{WASHING FACE} \\ \text{WISH TO CHECK} \\ \text{CONDITION} \end{pmatrix} \begin{pmatrix} \text{NOISY} \\ \text{BEFORE} \\ \text{CLEANING} \\ \text{SUNNY} \end{pmatrix} \begin{pmatrix} \text{INTERVAL} \quad 35/100 \\ \text{CLEARNESS} \quad 20/100 \end{pmatrix}$$

[CONNECTION REQUEST LEVEL OF USER A] × [CONNECTION REQUEST LEVEL OF USER B] = [OPTIMUM CONNECTION DEGREE] ... FORMULA 2

( INTERVAL 35/100
CLEARNESS 20/100 )

( INTERVAL 65/100
CLEARNESS 80/100 )

( INTERVAL 35/100
CLEARNESS 50/100 )

INFORMATION PROCESSING APPARATUS, INFORMATION PROCESSING METHOD, AND PROGRAM

CROSS-REFERENCE TO RELATED APPLICATIONS

This application is a national phase entry under 35 U.S.C. § 371 of International Application No. PCT/JP2016/078617 filed Sep. 28, 2016, which claims the priority from Japanese Patent Application No. 2015-242437 filed in the Japanese Patent Office on Dec. 11, 2015, the entire contents of which are hereby incorporated by reference.

Technical Field

The present disclosure relates to an information processing apparatus, an information processing method, and a program.

BACKGROUND ART

In recent years, there has been proposed a video conference system that uses the development of communication technologies to allow for conversations between two places in which a plurality of participants are present. Specifically, for example, there are provided a display apparatus, a camera, an MIC, and a speaker in each place. Video and sound data that are respectively captured and picked up in one of the places are output in real time from the display apparatus and speaker installed in the other place.

Regarding such a bi-directional communication technology, for example, Patent Literature 1 below proposes a technology that allows, when a window-like imaging display apparatus is used to perform bi-directional communication, a viewer side human to view the video corresponding to changes in the position and angle of the viewer side human. This resolves the discrepancy in gaze between users who make conversations through television.

In addition, Patent Literature 2 below proposes that it be possible to determine the degree of a request for communication between a user and a communication partner on the basis of state information of the user, and perform comfortable communication that is not inconvenient for each other. With this arrangement, it is possible to prevent the user from receiving an inconvenient call such as a call made by the partner missing the state information, and a compulsory call made by the partner.

CITATION LIST

Patent Literature

Patent Literature 1: JP 4576740B
Patent Literature 2: JP 4645355B

DISCLOSURE OF INVENTION

Technical Problem

However, in Patent Literature 1 above, the use of the window-like imaging display apparatus attains the effects that make a user feel that spaces which are apart from each other were connected through one window, but the spaces come into contact with each other with a distance of zero. Accordingly, the user feels reluctant to have a partner at close hand in some cases.

In addition, Patent Literature 2 described above takes proper measures against the timing (i.e., call timing) for connecting spaces, but does not also mention anything about the distance between spaces.

Then, the present disclosure proposes an information processing apparatus, an information processing method, and a program capable of producing the distance to a communication partner by using a three-dimensional expression to connect spaces, and realizing more comfortable communication.

Solution to Problem

According to the present disclosure, there is proposed an information processing apparatus including: a reception unit configured to receive data from a communication destination; a generation unit configured to generate space image information in which an image corresponding to a space of the communication destination is disposed at a predetermined position in a three-dimensional space; and a display control unit configured to perform control such that the generated space image information is displayed on a display unit in a communication source.

According to the present disclosure, there is proposed an information processing method including, by a processor: receiving data from a communication destination; generating space image information in which an image corresponding to a space of the communication destination is disposed at a predetermined position in a three-dimensional space; and performing control such that the generated space image information is displayed on a display unit in a communication source.

According to the present disclosure, there is proposed a program for causing a computer to function as: a reception unit configured to receive data from a communication destination; a generation unit configured to generate space image information in which an image corresponding to a space of the communication destination is disposed at a predetermined position in a three-dimensional space; and a display control unit configured to perform control such that the generated space image information is displayed on a display unit in a communication source.

Advantageous Effects of Invention

As described above, according to the present disclosure, it is possible to produce the distance to a communication partner by using a three-dimensional expression to connect spaces, and realize more comfortable communication.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a diagram illustrating an example of a calculation formula of a user's connection request level according to the present embodiment.

MODE(S) FOR CARRYING OUT THE INVENTION

Figure 1:
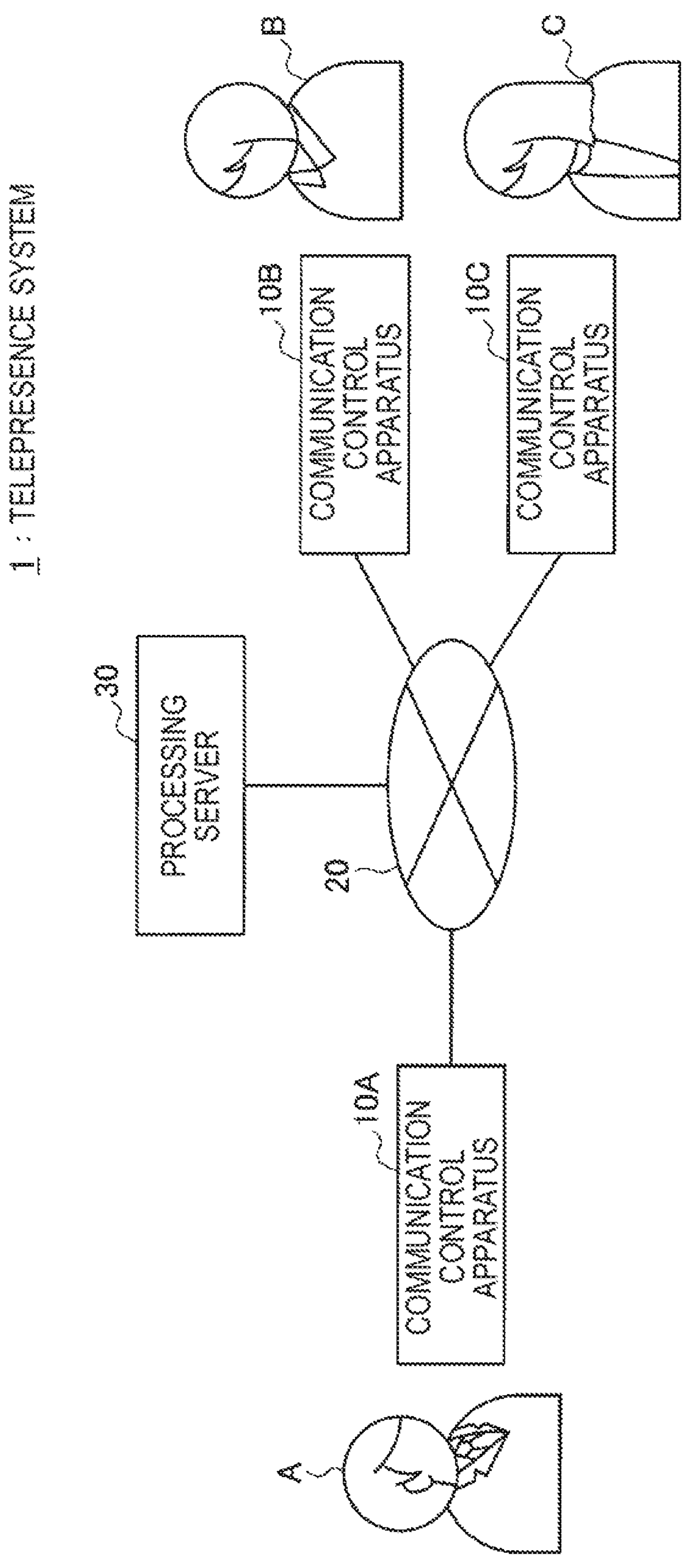
FIG. 1 is a diagram illustrating an overview of a telepresence system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be made in the following order.

1. Overview of Information Processing Apparatus according to Embodiment of the Present Disclosure
2. Configuration of Communication Control Apparatus
3. Display Example of Space Information
3-1. Separation Distance
3-2. Use of 3D Courtyard Space
3-3. Scene Case
3-4. Screen Change corresponding to Gaze Movement
4. Operation Processing
4-1. Communication Control Processing
4-2. Scene Setting Processing
5. Applied Example
6. Conclusion «1. Overview of Information Processing Apparatus According to Embodiment of the Present Disclosure»

The overview of a telepresence system 1 according to an embodiment of the present disclosure will be described with reference to FIG. 1. The telepresence system 1 according to the present embodiment connects spaces that are apart from each other by using video/sound/other information channels, and makes it possible to feel as if the places were connected and a partner existed. For example, when parents live apart from a child, the telepresence system 1 according to the present embodiment makes it possible to make their living-room spaces appear to be connected via a window or a door. For example, in the case where their living-room spaces are connected, a user is able to lead a life roughly grasping the condition of the partner space (e.g., the condition of the child, the condition of the parents, or the like).

The general video chat technology is capable of switching 0 and 1 such as displaying/not displaying video or turning sound on/off (mute) when performing remote communication through video sound channels, but incapable of finely adjusting the connection degree. Therefore, the general video chat technology fails to meet the needs of a user that the user does not wish to constantly connect to a partner with a realistic sense of presence, but wishes to feel the condition of the partner. In addition, it is necessary for a user to manually switch connection states. It also prevents increase in usage frequency from the perspective of operation cost.

In addition, as the case where a telepresence communication apparatus is capable of gradually adjusting the connection degree, it is conceivable, for example, to perform two-dimensional planar filter processing such as blur processing (blurring) or mask processing (blocking) on the living-room video of a partner. However, although the video of a partner is not clearly visible, a user feels as if the partner were present right next to the user. It is impossible to express a pleasant interval.

Then, in the present embodiment, a three-dimensional expression is used to connect spaces, and control the distance between the connected spaces, thereby making it possible to realize more comfortable communication and provide a pleasant connection degree for a user. With respect to the distance between spaces, for example, it is possible to express depth by disposing, when the video (video of a living-room space) of a communication destination is displayed on a display unit in a communication source, the video (video of a living-room space) of the communication destination at a little apart position a three-dimensional space in which a predetermined scene is reflected, and make a user feel that the communication partner is present not right in front of the user, but in a little apart place.

In addition, the distance between spaces which corresponds to the connection degree is automatically and continuously optimized in accordance with a user state or the like, thereby making it possible even to reduce the load of a user operation.

More specifically, as illustrated in FIG. 1, the telepresence system 1 according to the present embodiment has communication control apparatuses 10A, 10B, and 10C connected via a network 20. In addition, the network 20 is connected to a processing server 30.

The communication control apparatuses 10A, 10B, and 10C each include an input unit. The communication control apparatuses 10A, 10B, and 10C respectively acquire information of the spaces in which a user A, a user B, and a user C are present, and transmit the information to another communication control apparatus 10 or the processing server 30. In addition, the communication control apparatuses 10A, 10B, and 10C each include an output unit, and output information received from another communication control apparatus 10 or the processing server 30.

The processing server 30 performs synchronization processing for bi-directional communication when any two or more of the communication control apparatuses 10A to 10C are connected, or performs computation/control or the like of separation distance based on the connection request levels from both. Note that these synchronization processing, calculation/control of separation distance, or the like may be performed in each of the communication control apparatuses 10A, 10B, and 10C, and the system configuration can dispense with the processing server 30.

«2. Configuration of Communication Control Apparatus»

Figure 2:
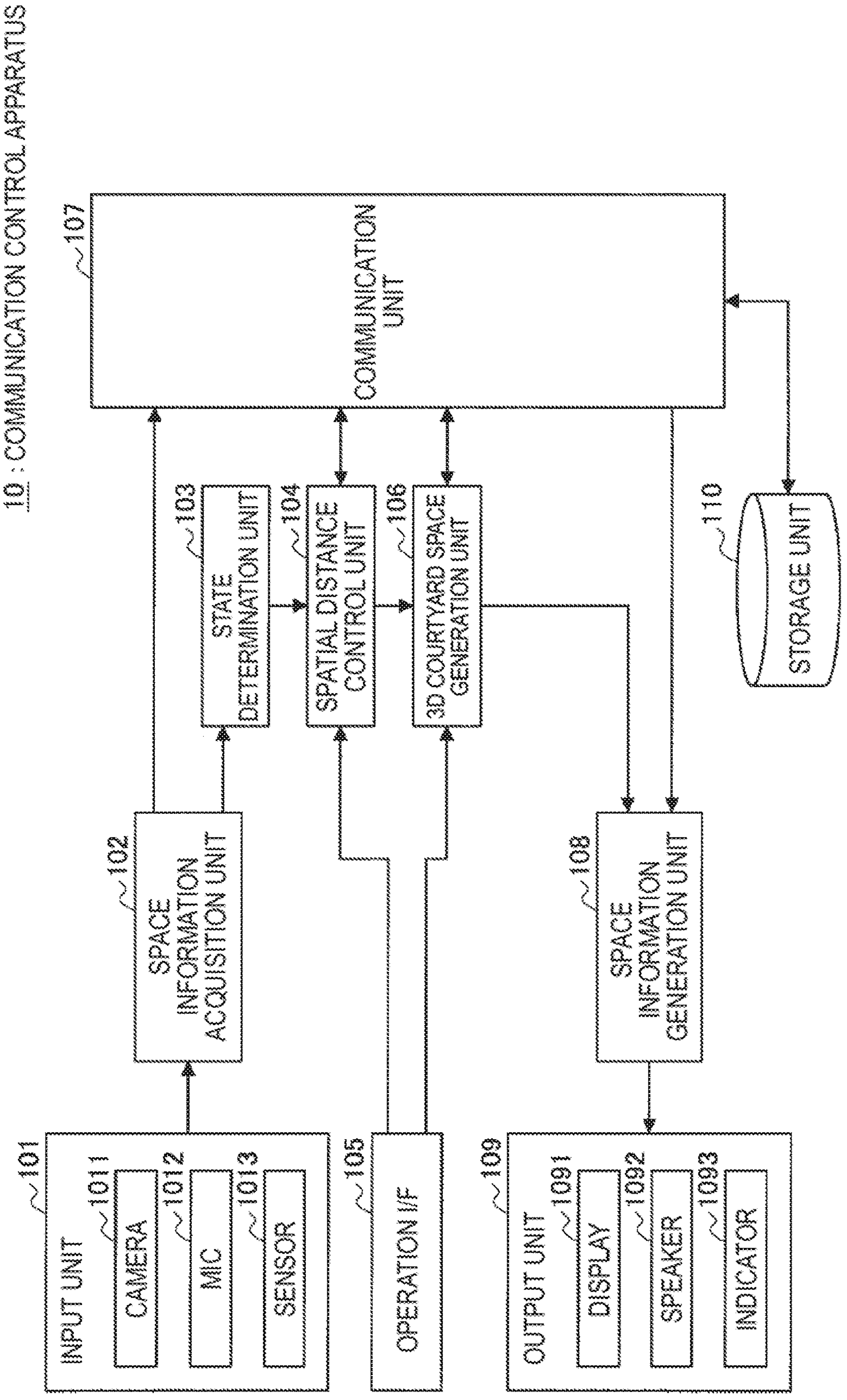
FIG. 2 is a block diagram illustrating an example of a configuration of a communication control apparatus according to the present embodiment.

Next, the configuration of a communication control apparatus 10 according to the present embodiment will be described with reference to FIG. 2. FIG. 2 is a block diagram illustrating an example of the configuration of a communication control apparatus 10 according to the present embodiment.

As illustrated in FIG. 2, the communication control apparatus 10 includes an input unit 101, a space information acquisition unit 102, a state determination unit 103, a spatial distance control unit 104, an operation interface (I/F) 105, a 3D courtyard space generation unit 106, a communication unit 107, a space information generation unit 108, an output unit 109, and a storage unit 110.

The input unit 101 has a function of receiving space information. For example, the input unit 101 is implemented by a camera 1011, an MIC (abbreviated from a microphone) 1012, and a sensor 1013. A plurality of cameras 1011 may also be included. The plurality of cameras 1011 image the inside of a space (e.g., living room), and acquire captured images. In addition, a plurality of MICs 1012 may be included. The plurality of MICs 1012 pick up the sound in a space, and the environment sound around the space (e.g., next room, corridor, outside of the house, or the like) to acquire sound data. In addition, the sensor 1013 has a function of sensing various kinds of information of the inside of a space or the area around the space. Examples of the sensor 1013 include a temperature sensor, a humidity sensor, an illuminance sensor, a motion sensor, a door opening and closing sensor, and the like.

The space information acquisition unit 102 acquires various kinds of space information from the input unit 101. The space information acquisition unit 102 prepares data such that the state determination unit 103 is capable of using the data as a material for state determination, and outputs the data. Preparing data refers to, for example, noise processing, image analysis, object recognition, sound analysis, or the like. Further, the space information acquisition unit 102 recognizes a user on the basis of the acquired space information. To recognize a user, it is assumed to identify the individual user in that space, or recognize the position (where the user is in the room, or the like), attitude (whether the user is standing, sitting, lying, or the like), emotion (whether the user is happy, sad, or the like), action (the user is cooking dinner, watching television, reading a book, or the like), busyness degree (whether or not the user is busying, or the like) of the user. In addition, the space information acquisition unit 102 recognizes an environment on the basis of the acquired space information. To recognize an environment, it is assumed to recognize the current time (morning, noon, evening, or midnight), brightness (brightness of the room, or light from a window), temperature, audio (sound picked up in the space), region (place where the space exists), in-order degree (to what extent the room is cleaned up), or the like of the space.

The state determination unit 103 determines the state of a space or the state of a user (i.e., context of a space serving as a communication source) on the basis of the information acquired and output by the space information acquisition unit 102. For example, the state determination unit 103 determines the state of a space or the state of a user on the basis of a user recognition result and an environment recognition result of the space information acquisition unit 102. Note that the context of a space serving as a communication source can include the state of a user, the state of a real space where a user is present, time, a season, weather, a place, or the relationship with a partner user.

The spatial distance control unit 104 has a function of controlling the distance (depth separation distance) between connected spaces in a three-dimensional space. In the present embodiment, information acquired from the space of a communication destination is disposed with appropriate distance in a three-dimensional space to show depth for the connection. This realizes a pleasant connection state. Here, with reference to FIGS. 3A and 3B, the distance between spaces in a three-dimensional space according to the present embodiment will be described. In the examples illustrated in FIGS. 3A and 3B, the case will be described where a partner space image 41 is disposed with predetermined distance in the depth direction in a three-dimensional space on the basis of a window frame 40 displayed on a display 1091A of a communication source.

Figure 3A:
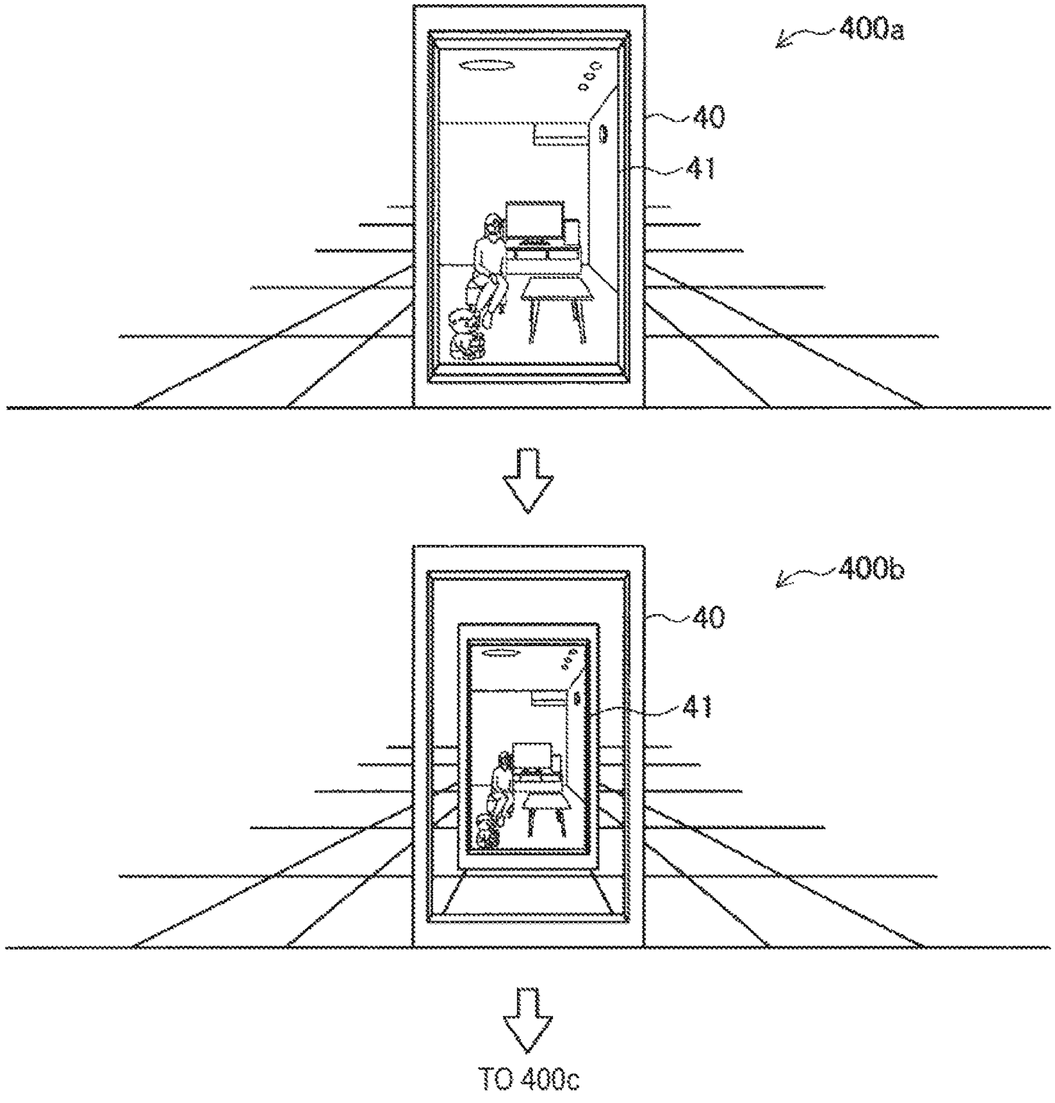
FIG. 3A is a diagram that describes distance between spaces in a three-dimensional space according to the present embodiment.
Figure 3B:
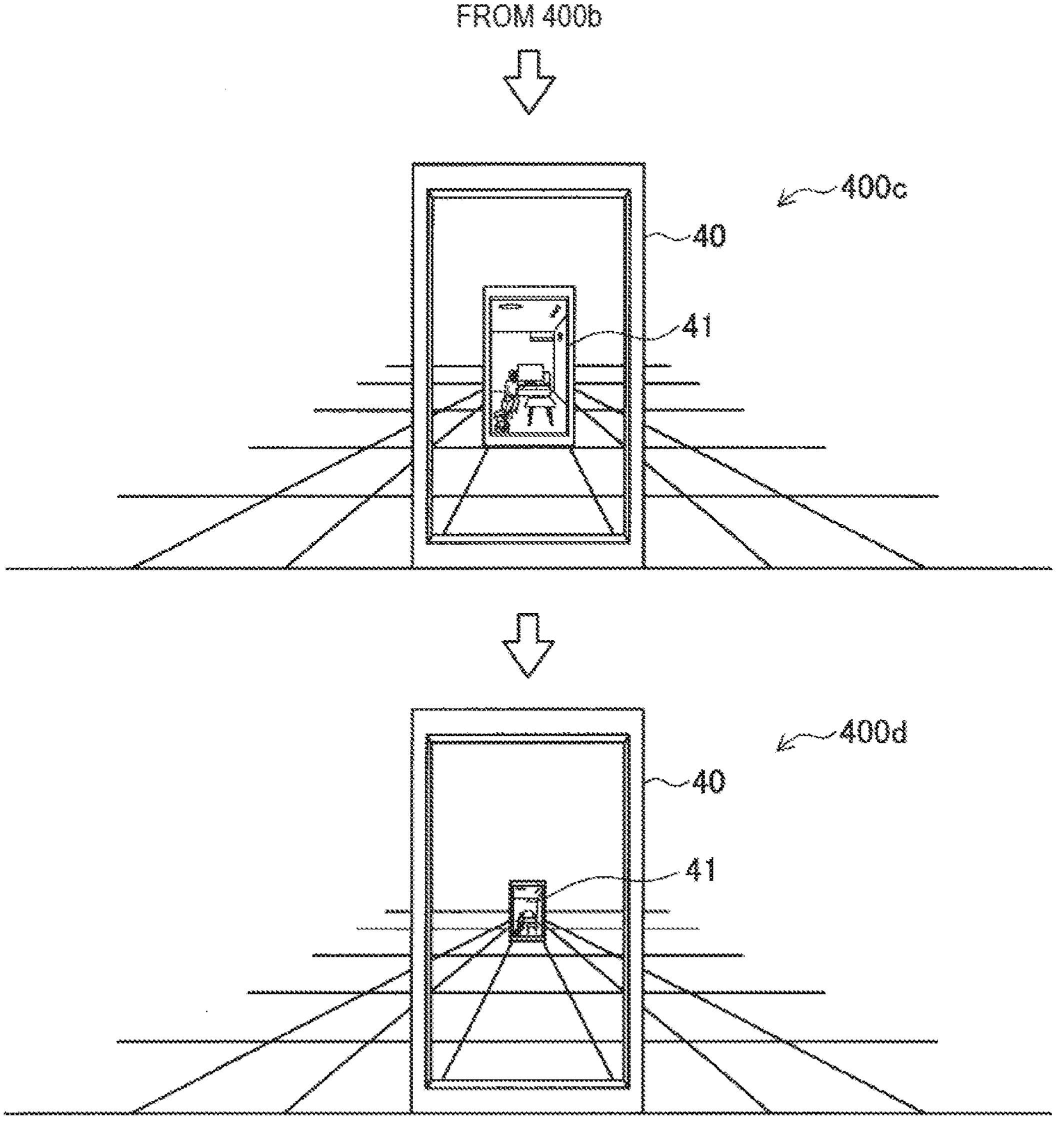
FIG. 3B is a diagram that describes the distance between the spaces in the three-dimensional space according to the present embodiment.

The upper part of FIG. 3A illustrates a disposition example 400*a* in which the partner space image 41 is disposed with a distance of 0 from the window frame 40 in a three-dimensional space. In this case, the partner space image 41 is displayed up to the window frame 40, and a user is able to feel the space of the partner right in front of the user via one window. The lower part of FIG. 3A illustrates a disposition example 400*b* in which the partner space image 41 is disposed with some distance from the window frame 40. In this case, the partner space image 41 is displayed with some distance from the window frame 40 in the depth direction. Since the space of the partner is positioned a little apart, a user feels less physical reluctance than the user does with a distance of zero. Next, the upper part of FIG. 3B illustrates a disposition example 400*c* in which the partner space image 41 is disposed with more distance. In this case, since the space of the partner is positioned apart, a user feels less psychological reluctance than the user does with the distance illustrated in the lower part of FIG. 3A. Next, the lower part of FIG. 3B illustrates a disposition example 400*d* in which the partner space image 41 is disposed with still more distance than in the disposition example 400*c* in the upper part of FIG. 3B. In this case, since the space of the partner is positioned more apart, a user feels less psychological reluctance than the user does with the distance illustrated in the upper part of FIG. 3B.

The distance to the partner space is adjusted, for example, on the basis of the connection request level of a user and the connection request level of a communication destination user. First, the connection request level of the user is calculated, for example, by the spatial distance control unit 104 on the basis of a determination result (context of the space of a communication source) output from the state determination unit 103. Here, FIG. 4 illustrates an example of the calculation formula of the connection request level of the user. As shown in a formula 1 of FIG. 4, a connection request level can be calculated by multiplying a user element (state of a user) by an environment element (state of a space). For example, in the case where a user is mother, and the state shows that the user is washing the face and wishes to check the condition of a communication destination space, and the space state shows that the inside of the space is noisy, the time is before cleaning, and it is sunny, the strength of the connection request level is calculated as a numeric value of 0 to 100.Note that it is also possible in the present embodiment to calculate an "interval" and "clearness" as the connection request level as illustrated in FIG. 4. That is, the "interval" means separation distance in a three-dimensional space. Outputting an "interval" to maintain appropriate distance to the connected partner makes it possible to realize a pleasant connection state. The "clearness" means the extent to which the video of a communication destination space is visible. In the present embodiment, blurring or blocking makes it possible to prevent the video of a partner from looking clear. The extent to which the video is visible is referred to as "clearness."

The connection request level of the communication destination user is transmitted from the communication control apparatus 10 serving as a communication destination via the communication unit 107.

Figure 5:
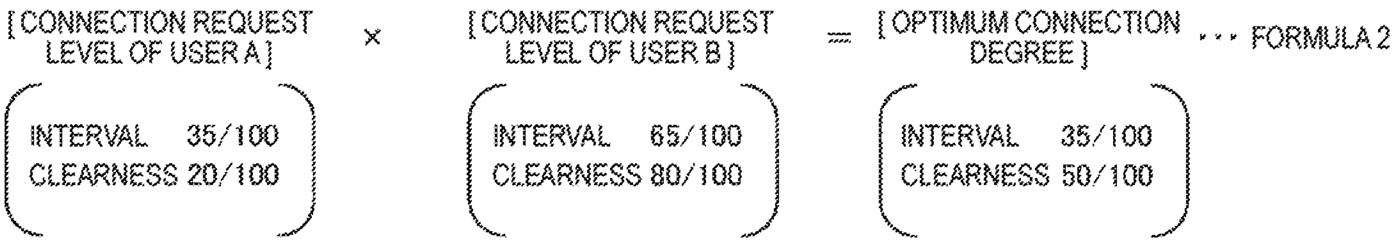
FIG. 5 is a diagram illustrating an example of a calculation formula of an optimum connection degree according to the present embodiment.

Then, the spatial distance control unit 104 calculates an optimum connection degree on the basis of the calculated connection request level of the user and the received connection request level of the communication destination user. Here, FIG. 5 illustrates an example of the calculation formula of the optimum connection degree. As shown in a formula 2 of FIG. 5, for example, in the case where the connection degree of the user A and the user B is calculated, the connection request level of the user A is multiplied by the connection request level of the user B to calculate the optimum connection degree. In the present embodiment, as the optimum connection degree is stronger, the distance between spaces becomes shorter and the video looks clearer. Accordingly, a connection is made with a realistic sense of presence. As the optimum connection degree is lower, the distance between spaces becomes longer and the video looks less clear. Accordingly, a connection is made with a less realistic sense of presence. Note that the calculation formula is described here as an example with the "connection degree" considered to include both the "interval" and the "clearness." However, the present embodiment is not limited thereto. The calculation may be made with the "connection degree" considered to include the "interval" alone.

The operation interface (I/F) 105 receives an operation input from a user, and outputs the operation input to the spatial distance control unit 104 or the 3D courtyard space generation unit 106. This enables a user to optionally set, for example, the "connection request level of the user" or set a scene of a space which will be described next. In addition, operation inputs from a user for various objects disposed in a three-dimensional space are also possible.

The 3D courtyard space generation unit 106 refers to the 3D space between the video of the space of a communication destination which is disposed in a three-dimensional space in accordance with the distance to a communication partner which is set by the spatial distance control unit 104, and the foreground side that is the communication source user side as "3D courtyard space," and generates the space. In the "3D courtyard space," information from the communication source or the communication destination is reflected. In addition, it is also possible to dispose a designated object in the "3D courtyard space." This makes it possible to display a screen that seems to connect to the space of the communication partner through the virtual courtyard. In addition, reflecting the user state of the communication partner, the space state, surrounding information of the partner space, or the like in the courtyard space makes it possible to indirectly recognize the state of the partner. The details of the 3D courtyard space generated by the 3D courtyard space generation unit 106 like this will be described below.

The communication unit 107 connects to another communication control apparatus 10 and the processing server 30 via the network 20, and transmits and receives data. For example, the communication unit 107 transmits space information output from the space information acquisition unit 102, spatial distance output from the spatial distance control unit 104, and information of a 3D courtyard space output from the 3D courtyard space generation unit 106 to the communication control apparatus 10 serving as a communication destination or the processing server 30. In addition, the communication unit 107 receives the space information, the spatial distance, the information of a 3D courtyard space, and the like received from the communication control apparatus 10 serving as a communication destination or the processing server 30. In the present embodiment, a 3D courtyard space displayed in a communication source and a communication destination and distance in a three-dimensional space can be synchronized. In addition, the communication unit 107 is also capable of receiving information (weather information, news, schedule information, or the like) acquired by the processing server 30 from a relative service server on a network, or directly receiving the information from the relative service server on the network.

The space information generation unit 108 generates space information and sends the space information to the output unit 109 on the basis of a 3D courtyard space generated by the 3D courtyard space generation unit 106 and the video of the space of a communication destination which is received via the communication unit 107. For example, the space information generation unit 108 generates space image information obtained by combining the video of the space of a communication destination which is received via the communication unit 107 with the 3D courtyard space generated by the 3D courtyard space generation unit 106, and performs control such that the space image information is displayed on a display 1091.

The output unit 109 has a function of presenting the space information generated by the space information generation unit 108 to the user of a communication source. For example, the output unit 109 is implemented by the display 1091, the speaker 1092, or an indicator 1093.

The storage unit 110 storages data transmitted and received via the communication unit 107. In addition, in the example illustrated in FIG. 2, the communication unit 107 is connected, but the present embodiment is not limited thereto. The storage unit 110 can be used as a storage area of each component included in the communication control apparatus 10.

«3. Display Example of Space Information»

Next, with reference to FIGS. 6 to 15, a display example of the space information according to the present embodiment will be described.

<3-1. Separation Distance>

As described above, in the present embodiment, the partner space image 41 is disposed with the distance (separation distance) corresponding to a connection degree based on the connection request levels of both a communication source and a communication destination in a three-dimensional space. Here, a display example of the display 1091A of a communication source in which separation distance gradually increases from the case where the separation distance is zero will be illustrated in FIGS. 6 to 8 and described.

Figure 6:
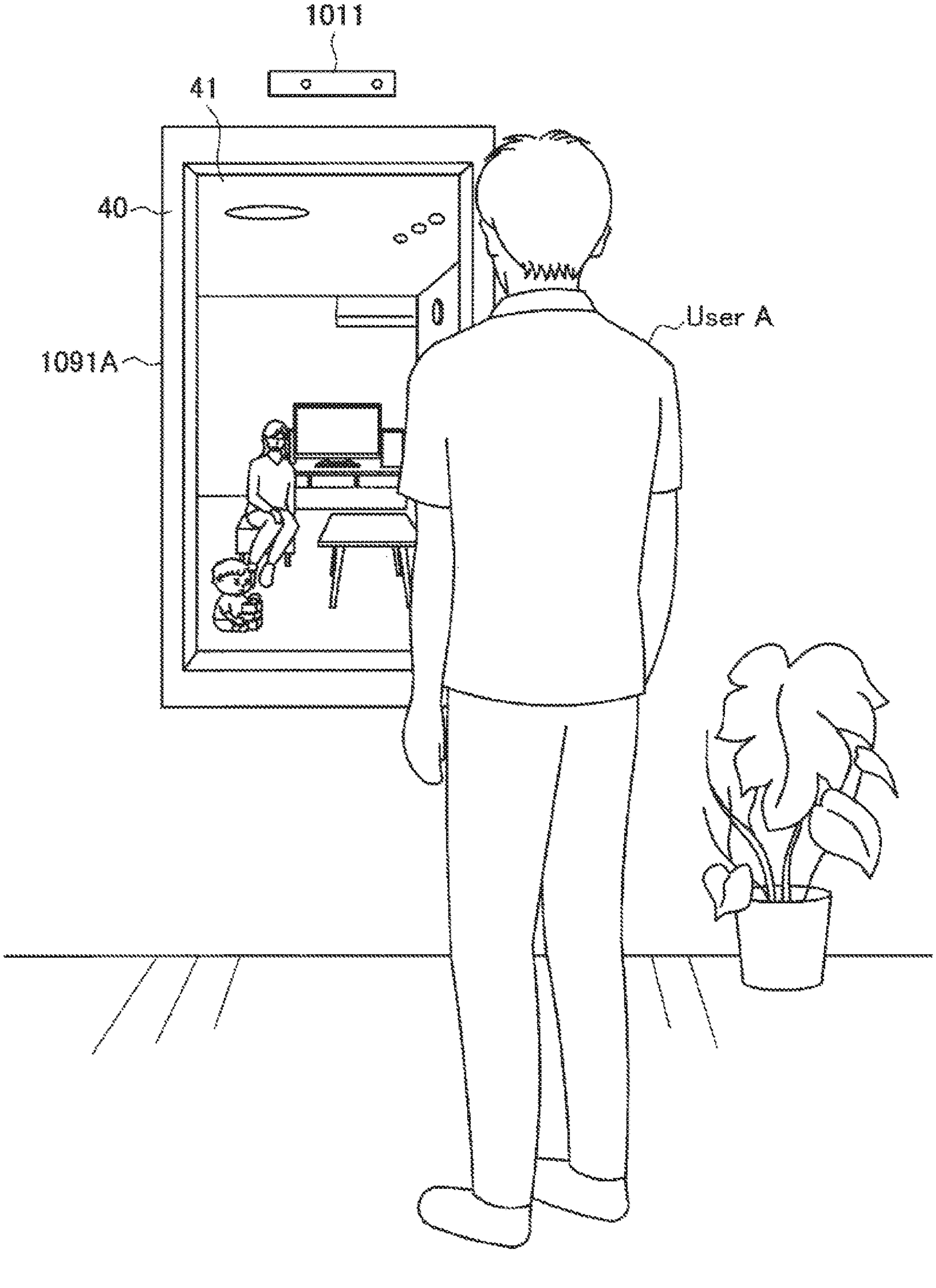
FIG. 6 is a diagram illustrating a display example according to the present embodiment with a spatial distance of zero.

FIG. 6 is a diagram illustrating a display example according to the present embodiment with a spatial distance of zero. As illustrated in FIG. 6, the window frame 40 is displayed on the display 1091A installed on the wall of the space in which the user A is present. The partner space image 41 is displayed up to the inner side of the window frame 40. The partner space image 41 is, for example, a captured image of the living room in which the partner user B is present. The video is, for example, real-time video captured in the partner space. Note that, in the example illustrated in FIG. 6, the camera 1011 is installed around the display 1091A. In addition, although not illustrated, the speaker 1092 and the MIC 1012 can also be installed around the display 1091A, and sound can be transmitted and received between connected spaces.

Figure 7:
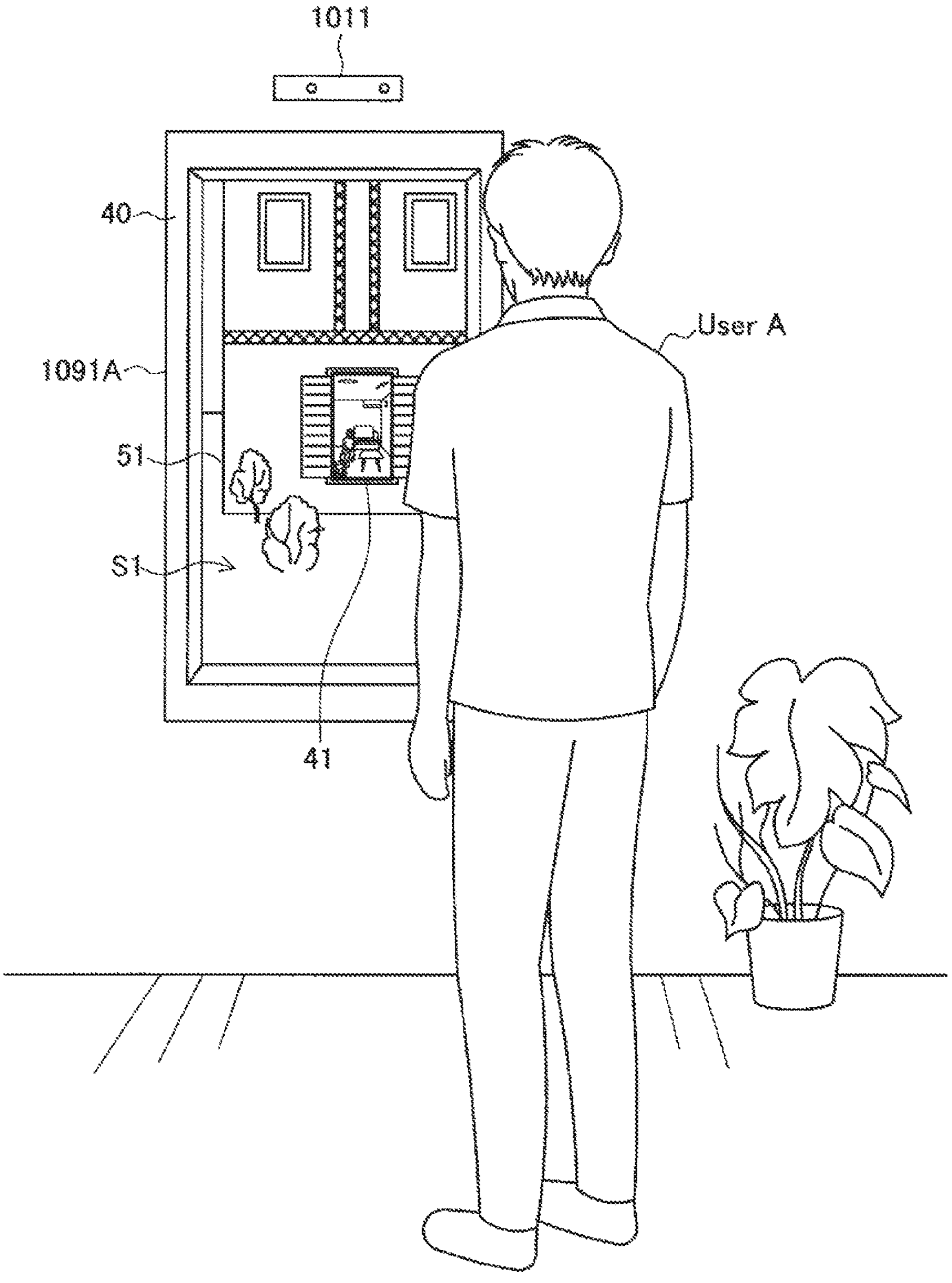
FIG. 7 is a diagram illustrating a display example according to the present embodiment with some spatial distance.

FIG. 7 is a diagram illustrating a display example according to the present embodiment with some spatial distance. As illustrated in FIG. 7, displaying the partner space image 41 in the back apart from the window frame 40 allows a user to visually feel the distance to a partner, and offers a comfortable connection extent in some cases rather than making the user feel the presence right in front of the user. The partner space image 41 is combined, for example, with a window portion of a virtual structure 51 in a three-dimensional space. In addition, a 3D courtyard space S1 is present between the user A and the partner space image 41. The user A is able to feel that the user A is connected to the partner space via the 3D courtyard space S1. In addition, the spatial distance and the 3D courtyard space are also synchronized in the partner space. The partner side display also displays the video of this side in real time with the same spatial distance, and similarly displays the 3D courtyard space in between.

Figure 8:
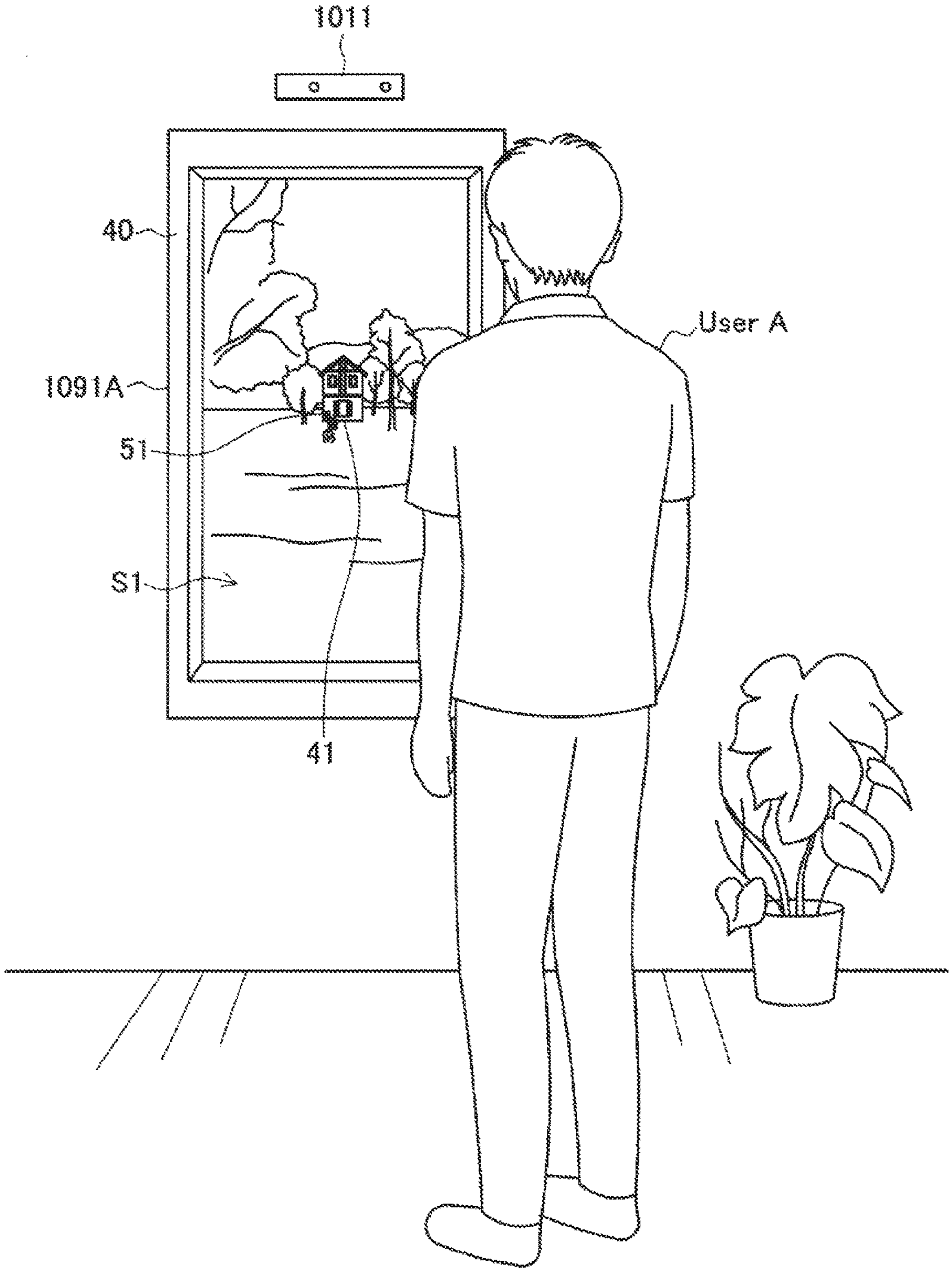
FIG. 8 is a diagram illustrating a display example according to the present embodiment with more spatial distance.

FIG. 8 is a diagram illustrating a display example according to the present embodiment with more spatial distance. The spatial distance here is still longer in the depth direction than the spatial distance in the case of FIG. 7. Accordingly, as illustrated in FIG. 8, the partner space image 41 is displayed more apart from the window frame 40, and a user visually feels the distance to the partner more strongly.

In FIGS. 6 to 8 described above, such a scene is applied that a user who is a communication partner lives in a log house on the opposite side in the forest. It is possible for a communication source user or a communication destination user to select such a scene in advance.

<3-2. Use of 3D Courtyard Space>

Next, a use example of a 3D courtyard space in a three-dimensional space in which the partner space image 41 is disposed will be described. In the present embodiment, for example, it is possible to realize mutual communication via objects displayed in a 3D courtyard space. That is, allowing both your own side and a partner side to mutually perform operations on or influence various targets disposed in a 3D courtyard space enables communication through the objects.

Figure 9:
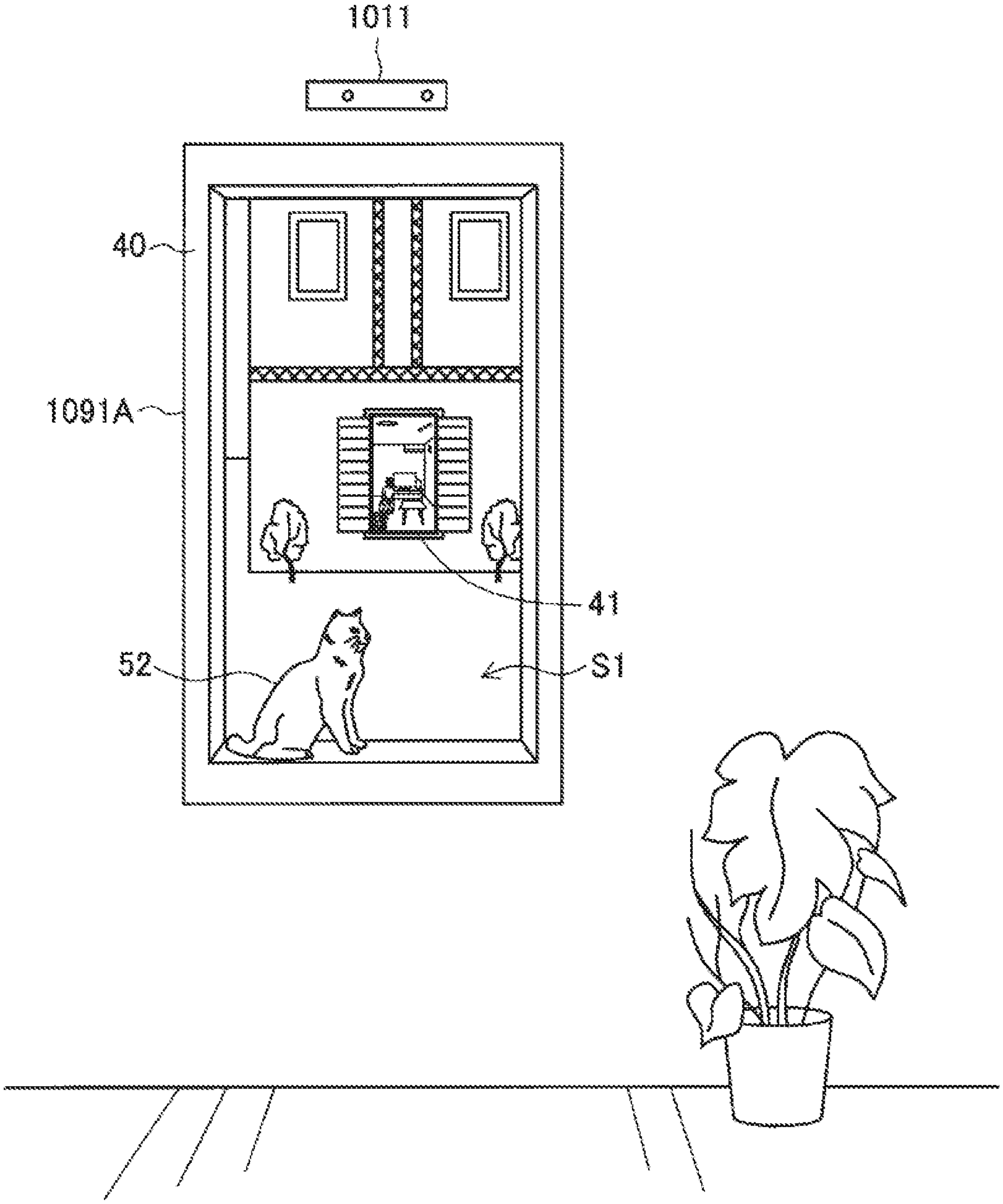
FIG. 9 is a diagram that describes a case where a virtual cat is present in a 3D courtyard space according to the present embodiment.

For example, a virtual pet may be disposed in a 3D courtyard space S1, a communication source user and a communication destination user may be able to give food to the virtual pet, and the territory of the pet may come closer to any of them in accordance with how much food is given or how often food is given. FIG. 9 is a diagram that describes a case where a virtual cat 52 is present in a 3D courtyard space S1 according to the present embodiment. In the example illustrated in FIG. 9, a communication source user gives much food. Accordingly, a cat 52 sits on the bay window portion of the window frame 40 on the communication source user side, which expresses the existence of the cat 52 more realistically. Food may be charged. In addition, it is assumed that a technique of influencing a virtual object in the 3D courtyard space S1 such as giving food is executed from a linked mobile apparatus, or executed according to a touch operation in the case where the display 1091A is a touch panel display (operation I/F 105). Alternately, it is assumed that the technique is executed from a lever, a switch, or the like installed therearound, or executed according to a gesture operation received by the camera 1011.

Figure 10:
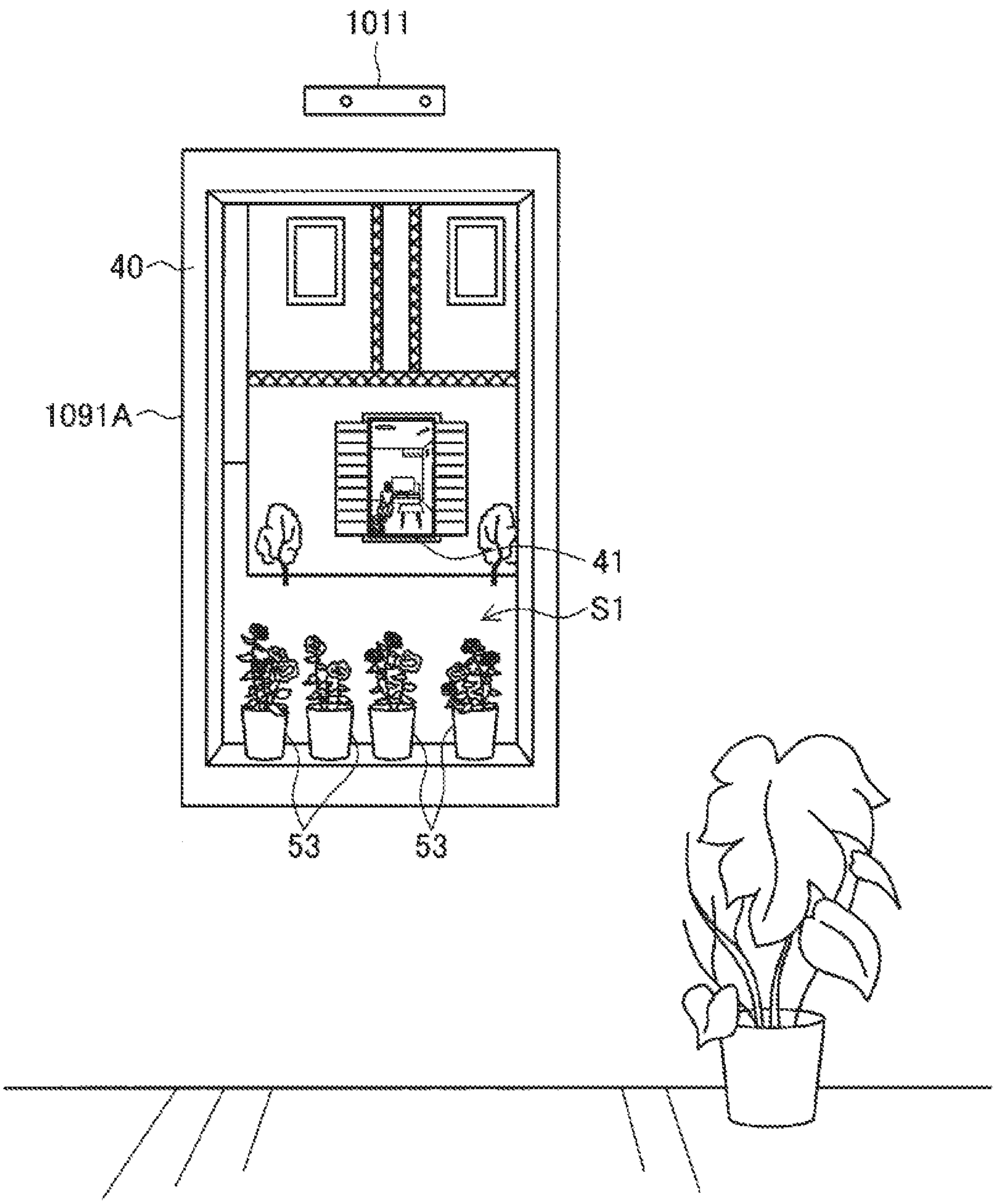
FIG. 10 is a diagram that describes a case where a flowerpot is disposed in the 3D courtyard space according to the present embodiment.

In addition, a virtual flower and plant are disposed in the 3D courtyard space S1, and a communication source user and a communication destination user sprinkle water and cast seed on the 3D courtyard space S1, thereby making it possible to realize communication of growing plants together. In addition, as illustrated in FIG. 10, plants 53 may be arranged on the bay window portion of the window frame 40. A communication source user may buy and dispose a favorite virtual plant, or dispose a virtual plant presented from a partner.

In addition, a bonfire may be disposed in the 3D courtyard space S1, and display control may be performed such that flames leap upward in the case where firewood is thrown from a communication source user and a communication destination user.

Figure 11:
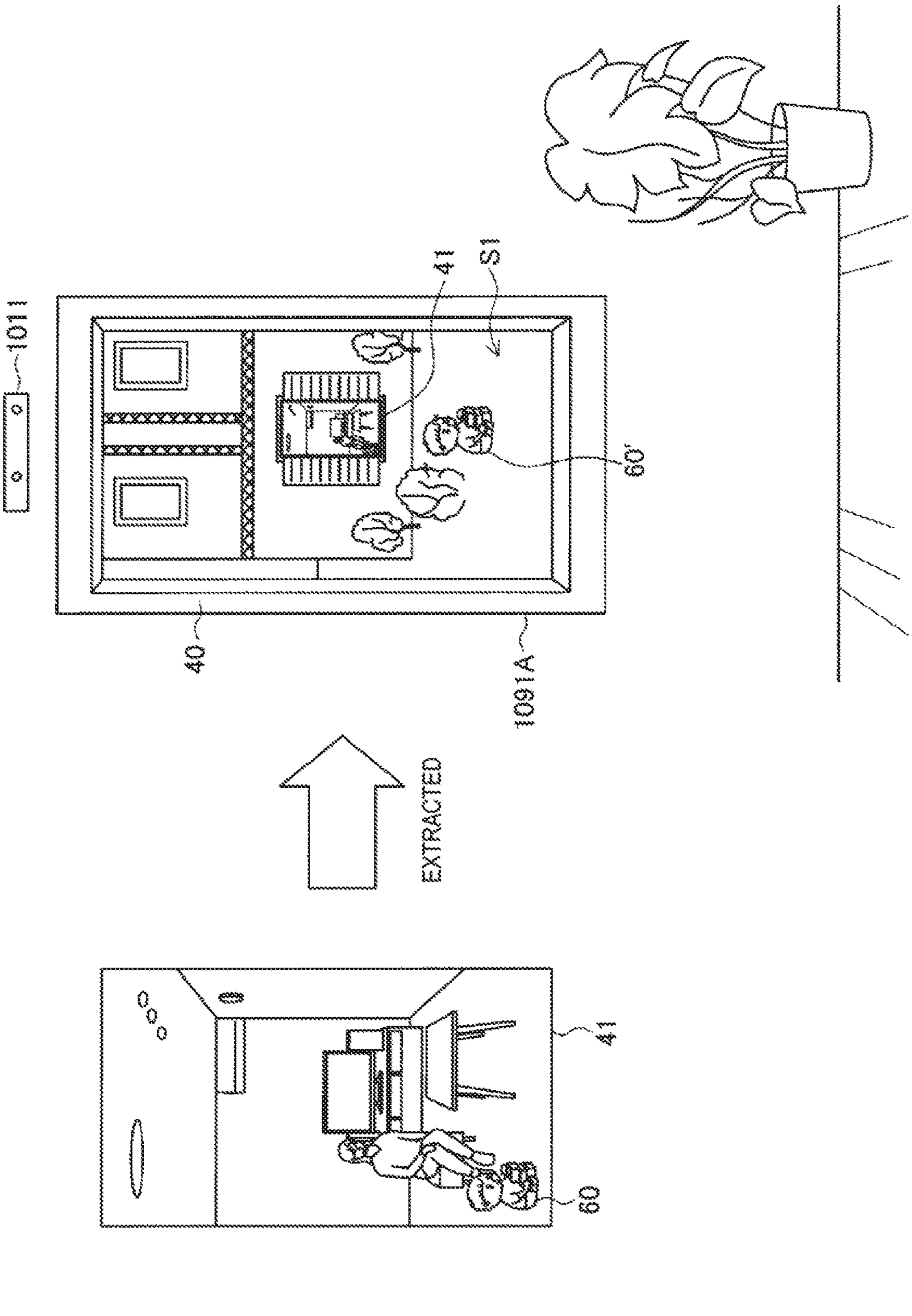
FIG. 11 is a diagram that describes a case where only a specific object in living-room video according to the present embodiment is disposed in the 3D courtyard space.

Further, a specific object extracted from the partner space image 41 may be disposed in the 3D courtyard space S1. This enables a specific part of the room to be selectively shared with a communication partner in the case where it is not desirable to show the entire room, but it is desired to show the grandparents only the condition of a playing child, or the like, for example, in the case where the room is messy. FIG. 11 is a diagram that describes the case where only a specific object in living-room video is disposed in the 3D courtyard space S1.

As illustrated in the left part of FIG. 11, only the video of a child image 60 permitted by a communication partner is extracted from the partner space image 41. As illustrated in the right part of FIG. 11, an extracted child image 60' is displayed in the 3D courtyard space S1 in front of the partner space image 41. With this arrangement, it is possible to display and view only the extracted specific part in the 3D courtyard space S1 even in the case where the partner space image 41 is distant and difficult to view. The extracted specific part is not limited to a human, but may also be an animal or an artifact. For example, it is possible to extract a pet in a partner space and dispose the pet in the 3D courtyard space S1. Alternatively, it is possible to dispose only a piano in a partner space and a player thereof in the 3D courtyard space S1, and listen to the player playing the piano.

To extract the child image 60 from the partner space image 41, for example, the use of a background separation technique of performing object recognition (depth recognition) on the partner space image 41 and extracting only a moving object (moving object recognition), or a person separation technique of recognizing the skeleton (bone) of a human, applying the movement of the joints or each part to a prescribed 3D model and extracting only a target person is assumed. By applying the child image 60 to a general 3D model (or a 3D model of the child which is acquired in advance), the communication control apparatus 10 is capable of expressing a moving child in the 3D courtyard space S1 more realistically.

In addition, in the present embodiment, the communication control apparatus 10 reflects various kinds of information acquired from the partner space in the 3D courtyard space, making it possible to indirectly show the condition of the partner.

For example, the communication control apparatus 10 may reflect environment information of the real space of a communication destination by reflecting the illumination (color temperature, brightness, or flicker) of the partner space in the 3D courtyard space or the bay window portion on the communication source user side with close distance, or the like. In addition, in the case where cookware is operated (ignited, or the like) in the partner space, the communication control apparatus 10 may perform control such that smoke is discharged from a virtual chimney of a virtual structure on which partner space video is disposed.

In addition, the communication control apparatus 10 may reflect the temperature, humidity, wind (airflow), or the like of the inside of the partner space in the 3D courtyard space (e.g., expressed with a virtual animal or plant that is disposed in the 3D courtyard space), or reproduce it with an air-conditioning control apparatus or the like in the communication source space.

Figure 12:
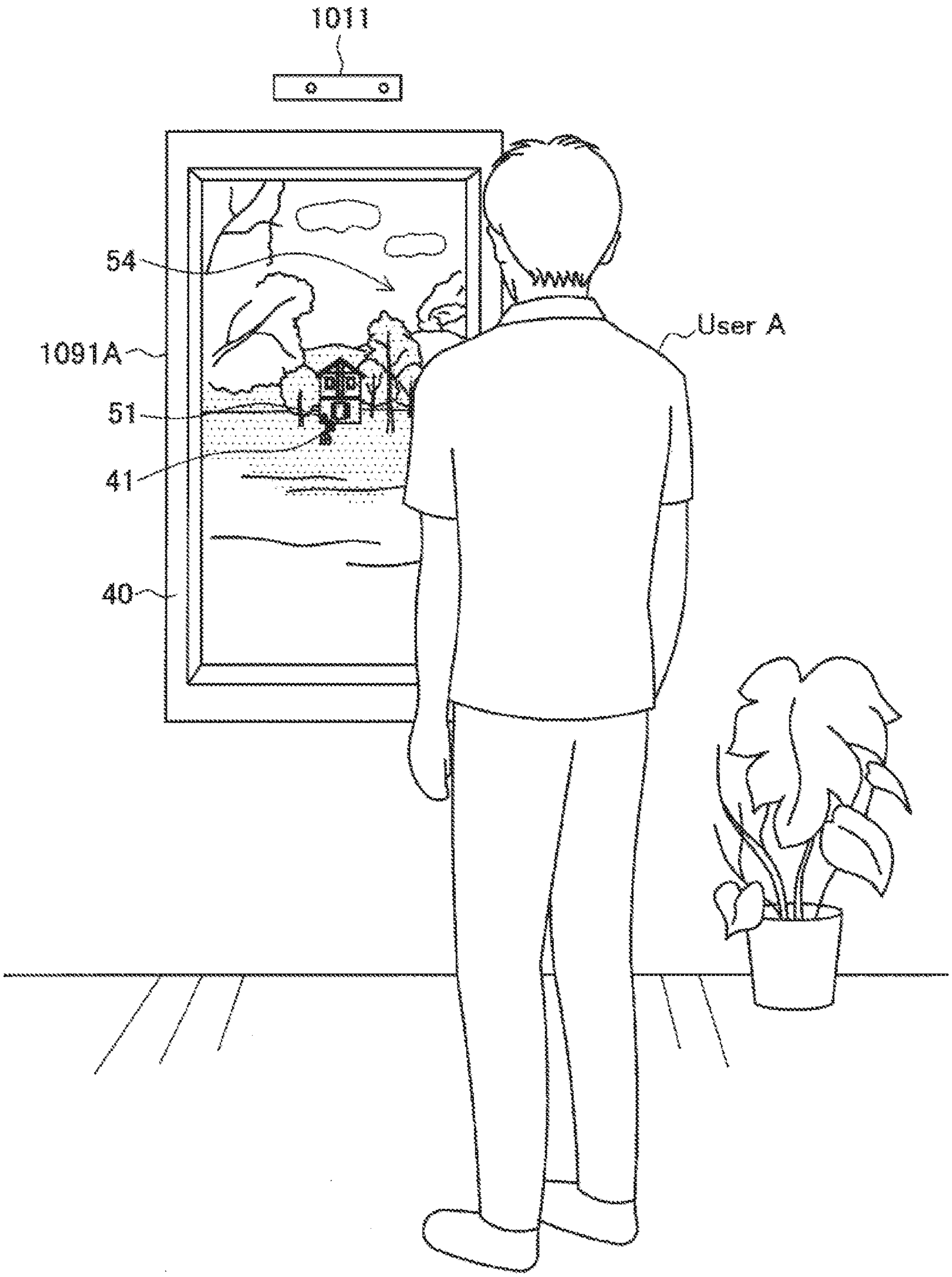
FIG. 12 is a diagram that describes a case where weather information of a region of a communication destination according to the present embodiment is reflected in a 3D space.

In addition, the communication control apparatus 10 may reflect the weather of the region of a communication destination. Specifically, for example, as a typhoon is approaching the region of a communication partner, the communication control apparatus 10 performs control such that it becomes cloudy above the house (virtual structure 51) of the partner, and trees around the house are blown by a strong wind. In addition, in the case where the region of a communication partner has a volcano, the communication control apparatus 10 may refer to weather information and reproduce the condition of a plume of smoke in real time. Here, FIG. 12 is a diagram that describes the case where the weather information is reflected in a 3D space. As illustrated in FIG. 12, the condition (object 54) of a plume of smoke or the weather of the region of a communication destination are reflected around the virtual structure 51 on which the partner space image 41 is disposed. The user A is able to grasp the weather situation of the communication destination in real time.

In addition, when a virtual plant is disposed in a 3D courtyard space, the communication control apparatus 10 may reflect weather information of the region of a communication destination or the region of a communication source in the virtual plant. For example, in the case where it remains sunny, the communication control apparatus 10 may perform control to make the plant grow up and produce flowers, and the like.

In addition, the communication control apparatus 10 may acquire action information of a communication partner for a day, and collectively display the digests thereof on a virtual billboard installed in the 3D courtyard space.

<3-3. Scene Case>

Figure 13:
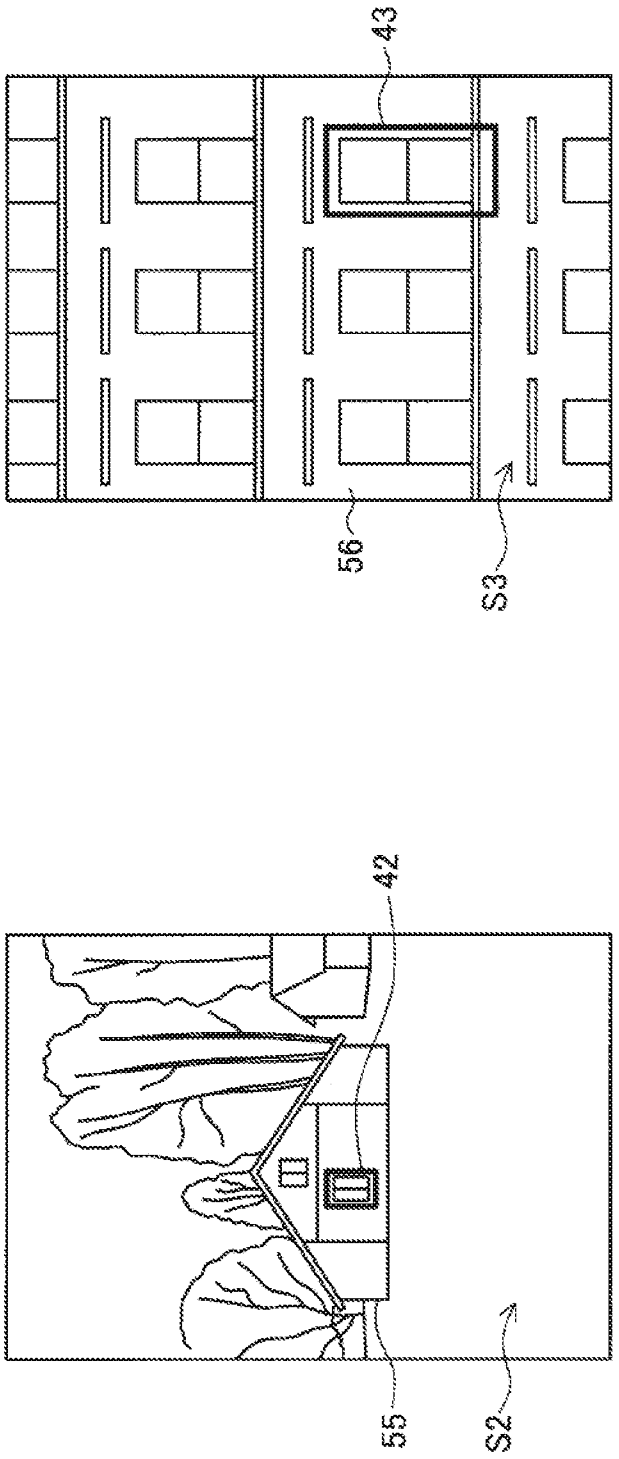
FIG. 13 is a diagram that describes a scene application example of the 3D space according to the present embodiment.
Figure 14:
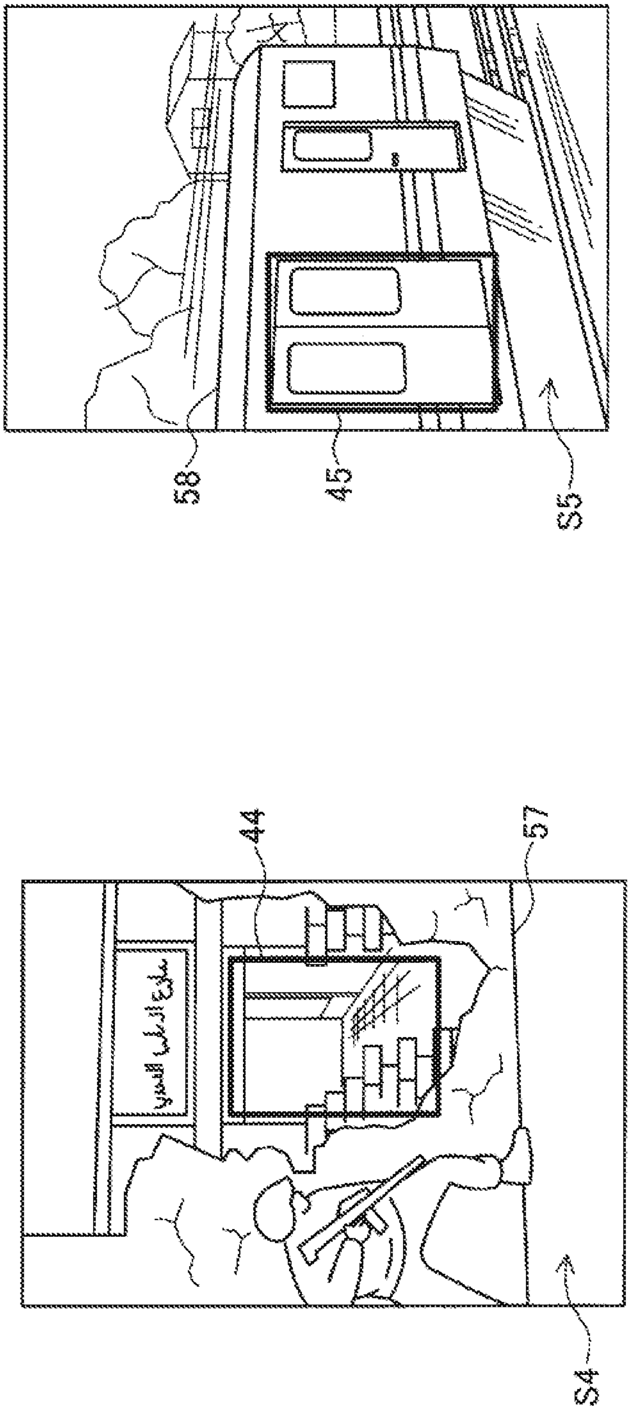
FIG. 14 is a diagram that describes a scene application example of the 3D space according to the present embodiment.

Various places are conceivable as scenes of a 3D space in which a partner space image is disposed. FIGS. 13 to 14 illustrate an example of an applied scene.

The left part of FIG. 13 illustrates that a scene S2 in which a communication partner lives in a log house on the opposite side in the forest is applied. A partner space image is displayed on a window portion 42 of a virtual structure 55. In addition, the right part of FIG. 13 illustrates that a scene S3 in which a communication partner lives in a room of a facing high-rise apartment in the city is applied. A partner space image is displayed on a window portion 43 of a virtual structure 56.

The left part of FIG. 14 illustrates that a scene S4 in which a communication partner (game partner) lives in a room in a certain fighting game is applied. A partner space image is displayed on a door portion 44 of a virtual structure 57. In addition, the right part of FIG. 14 illustrates that a scene S5 in which a communication partner is in a train traveling in parallel is applied. A partner space image is displayed on a door portion 45 of a virtual structure 58.

As each of the scenes as described above, in addition to a general scene registered in advance, a scene extracted from movie content or a scene extracted from game content is assumed. In addition, the scene S5, in which a communication partner is in a train travelling in parallel, may be applied in the case where a communication source user connects to a communication partner in a moving space such as an automobile or an electric train.

<3-4. Screen Change Corresponding to Gaze Movement>

In addition, the communication control apparatus 10 according to the present embodiment is capable of making the user A feel the presence of a space more strongly by changing the display screen in accordance with the gaze movement of the user A watching the display 1091A.

Figure 15A:
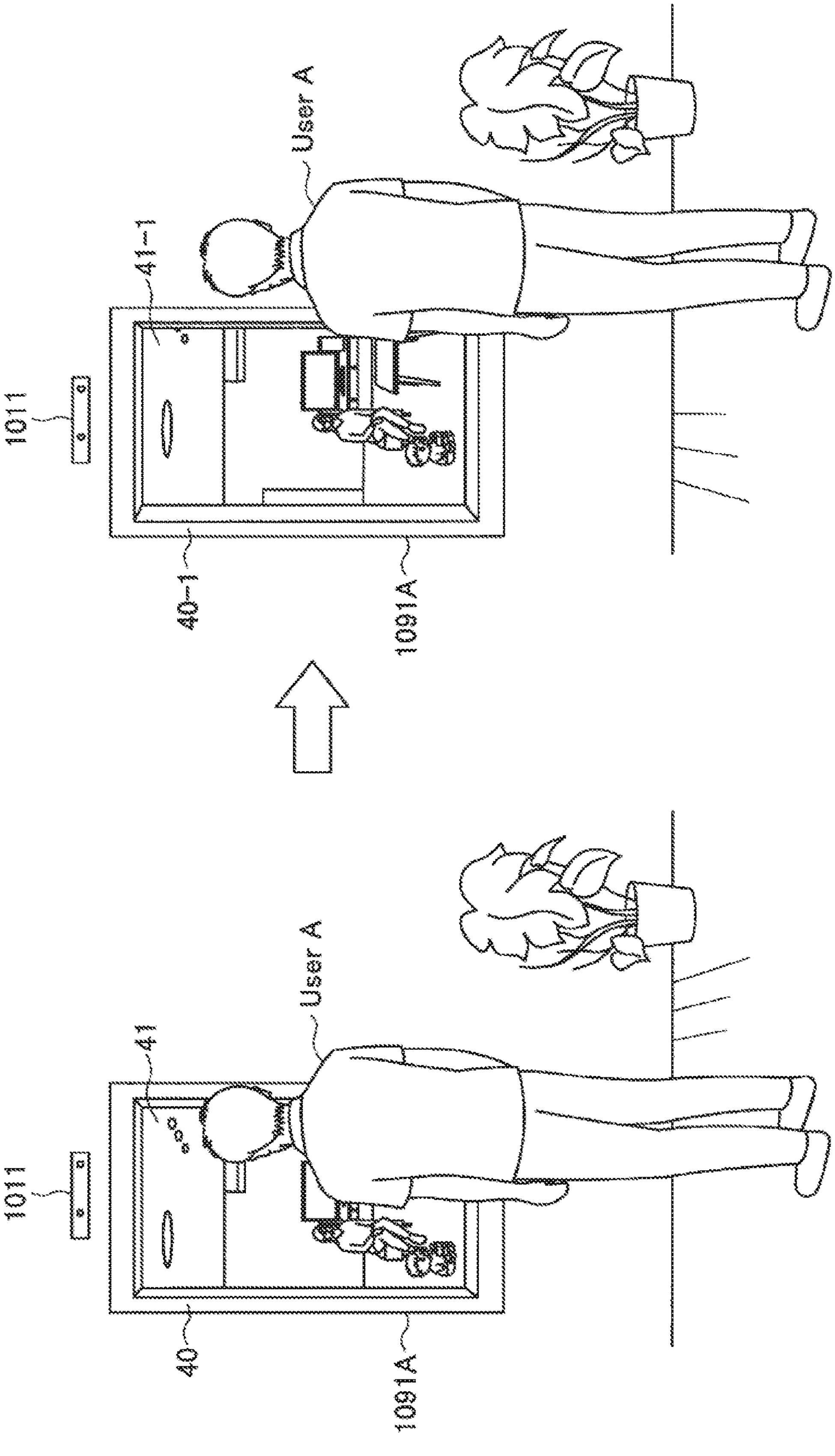
FIG. 15A is a diagram that describes a screen change corresponding to gaze movement according to the present embodiment.
Figure 15B:
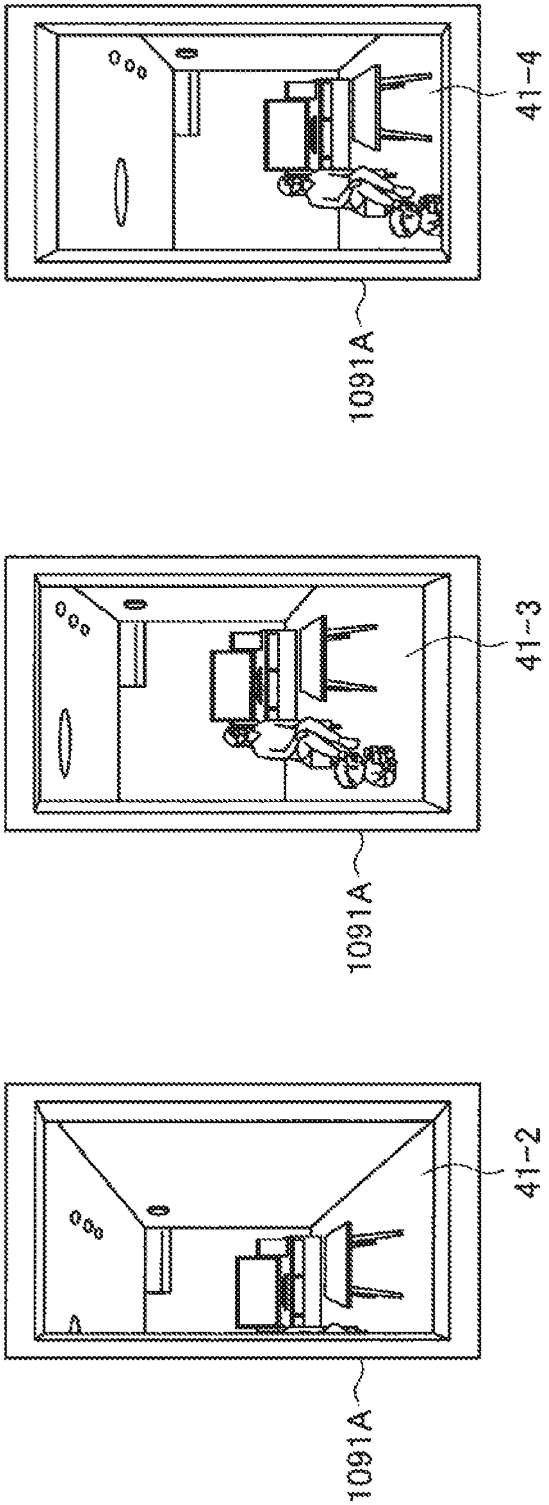
FIG. 15B is a diagram that describes a screen change corresponding to other gaze movement according to the present embodiment.

FIG. 15A is a diagram that describes a screen change corresponding to gaze movement according to the present embodiment. When the user A moves to the right side of the display 1091A as illustrated in the right part of FIG. 15A from the state in which the user A stands in front of the display 1091A watching the partner space image 41 as illustrated in the left part of FIG. 15A, the communication control apparatus 10 generates and displays a partner space image 41-1 whose angle is changed in accordance with the gaze movement. In the example illustrated in FIG. 15A, when the user A watches the display 1091A regarded as a window from the right side, the left side of the room is visible. In addition, in the case where the window frame 40 is expressed as a bay window image that is thick in the depth direction, the communication control apparatus 10 is capable of presenting a visual effect that a partner space seems to be actually connected via the window, by similarly changing the width of the thickness and angle of the bay window in accordance with the viewpoint movement. FIG. 15B is a diagram that describes a screen change corresponding to other gaze movement according to the present embodiment. The example illustrated in the left part of FIG. 15B is an example of a partner space image 41-2 that is displayed in the case where the user A (not illustrated) moves to the left of the display 1091A regarded as a window. When the display 1091A is watched from the left side, the right side of the room is visible via the window. In addition, the example illustrated in the middle of FIG. 15B is an example of a partner space image 41-3 that is displayed in the case where the user A moves in the up direction with respect to the display 1091A. When the display 1091A is watched from the up direction, the lower side of the room is visible via the window. In addition, the example illustrated on the right side of FIG. 15B is an example of a partner space image 41-4 that is displayed in the case where the user A moves in the down direction with respect to the display 1091A. When the display 1091A is watched from the down direction side, the upper side of the room is visible via the window.

The gaze movement can be sensed by the camera 1011. However, it is possible to perform similar display control by detecting not only the gaze of the user A, but also detecting the orientation of the head and following the head.

«4. Operation Processing»

Next, operation processing according to the present embodiment will be specifically described with reference to FIGS. 16 to 18.

<4-1. Communication Control Processing>

Figure 16:
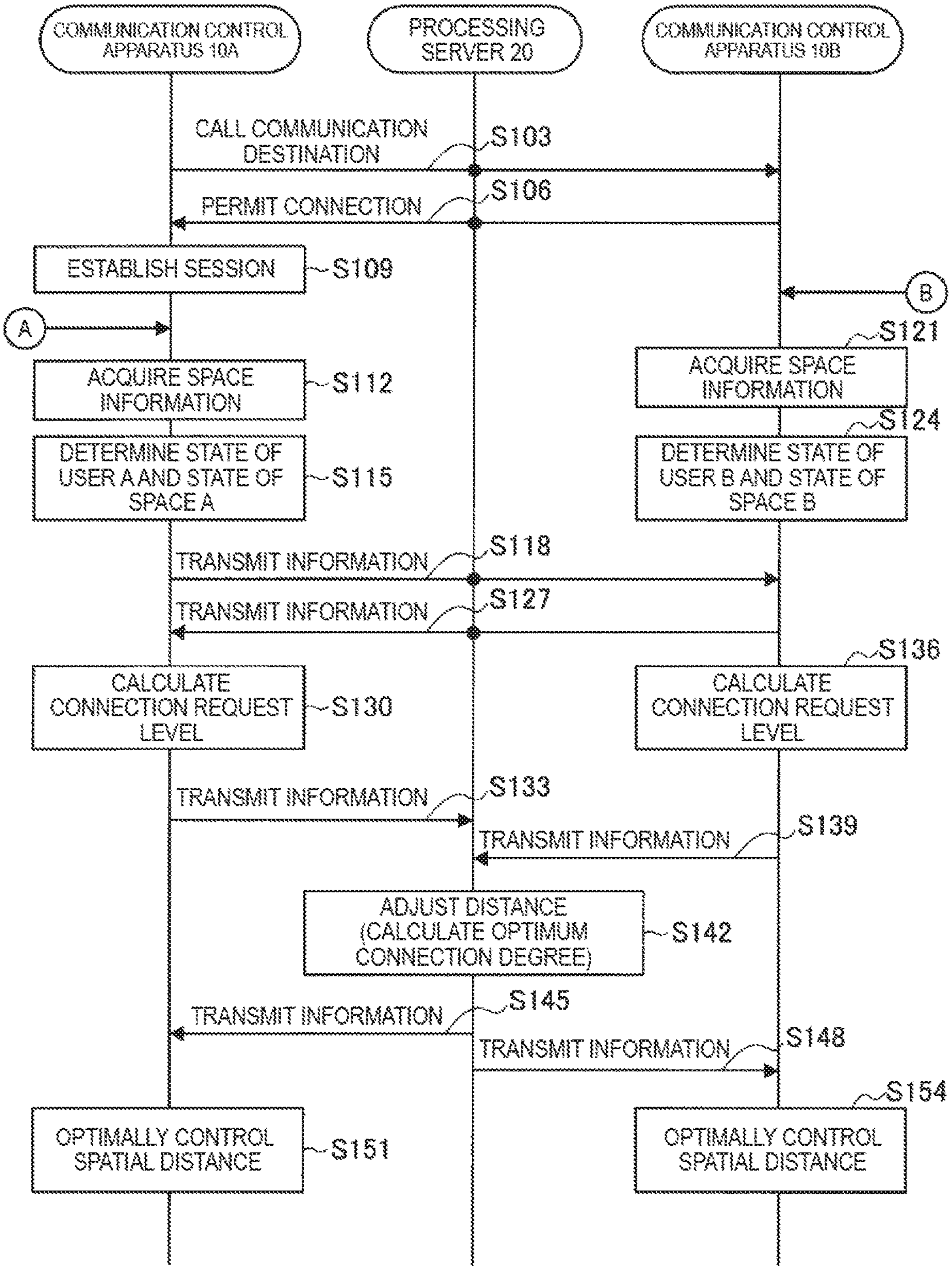
FIG. 16 is a sequence diagram illustrating communication control processing according to the present embodiment.
Figure 17:
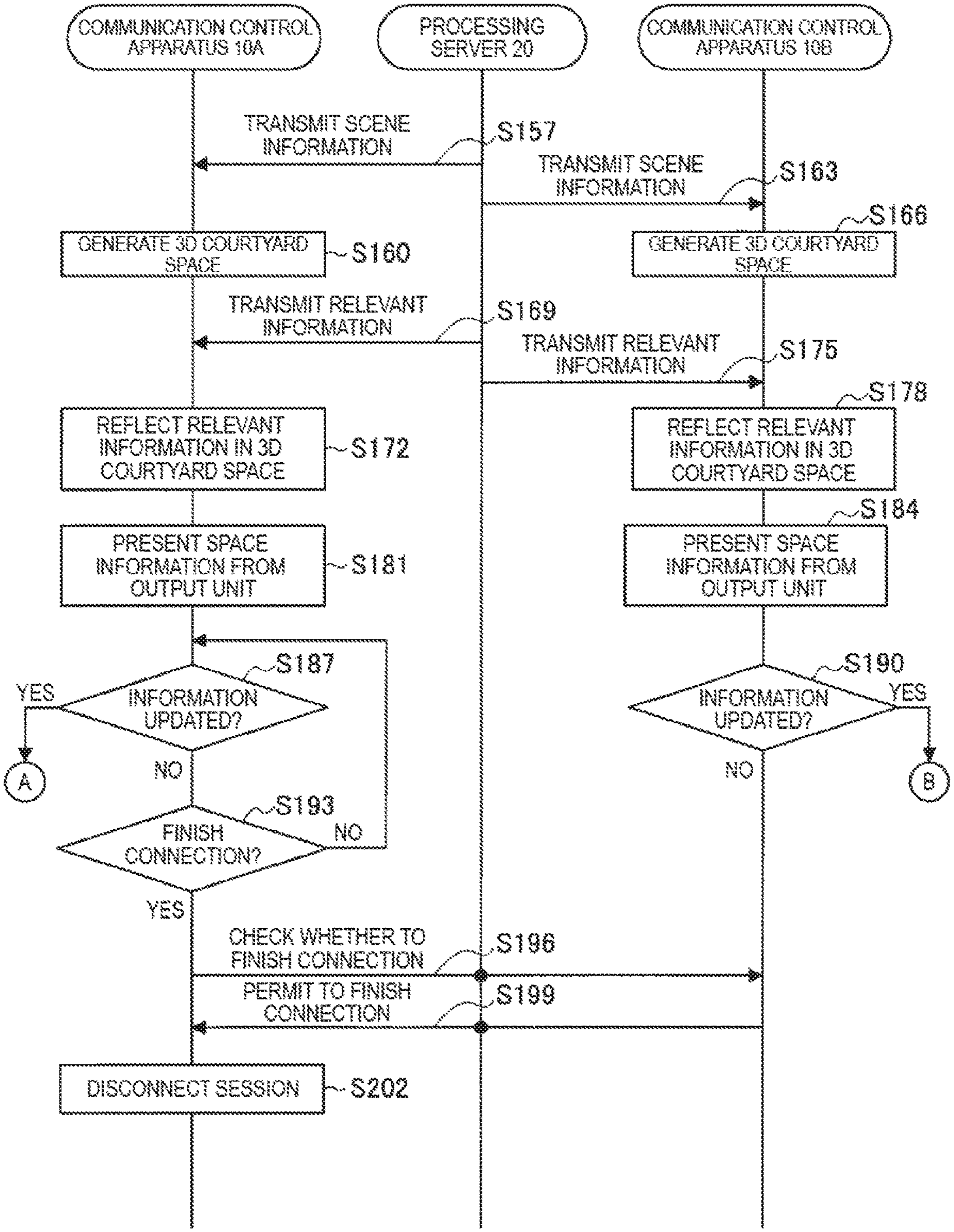
FIG. 17 is a sequence diagram illustrating the communication control processing according to the present embodiment.
Figure 18:
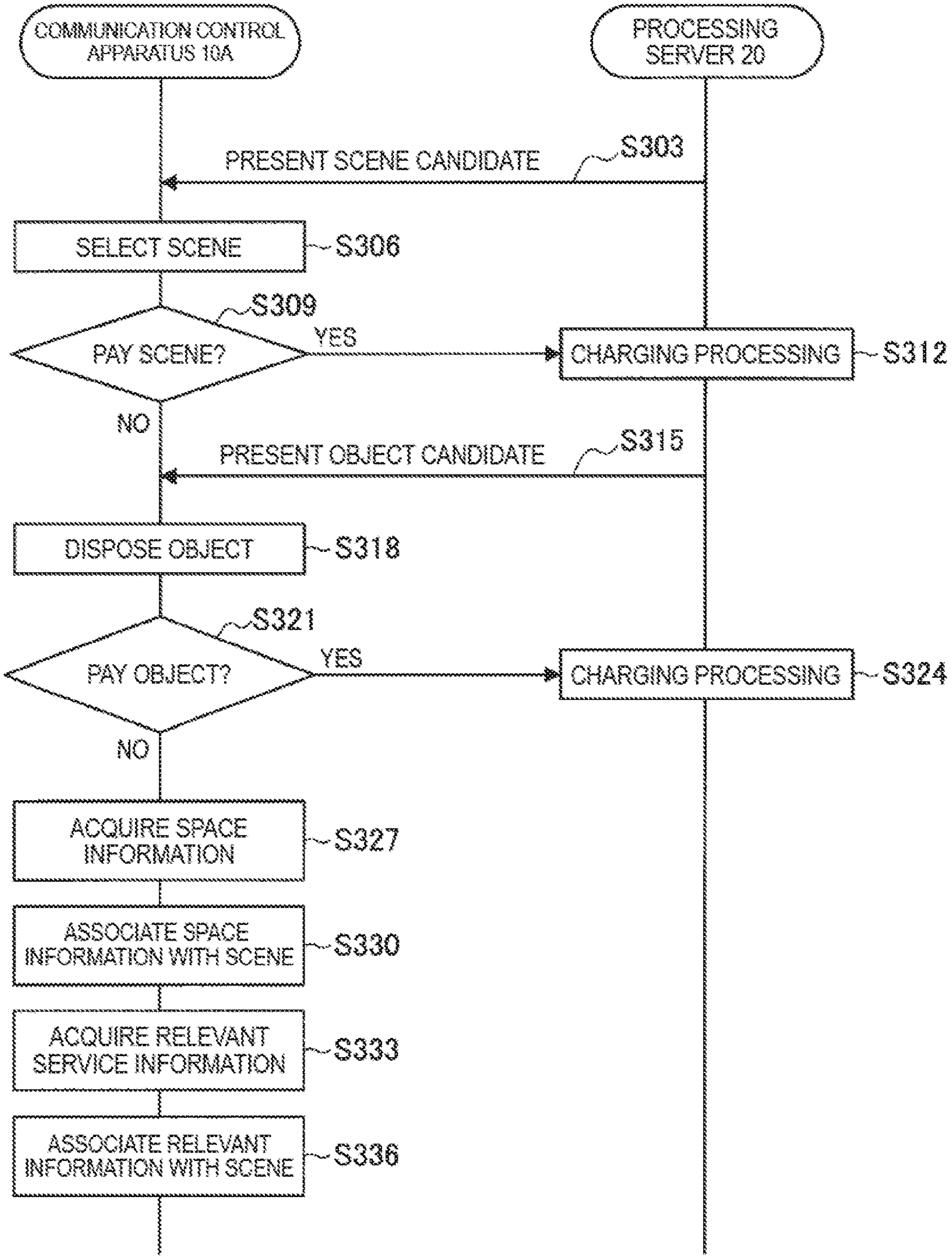
FIG. 18 is a flowchart illustrating scene setting processing according to the present embodiment.

FIGS. 16 and 17 are sequence diagrams each illustrating communication control processing according to the present embodiment. Here, as an example, the case will be described where the communication control apparatus 10A is a communication source (space A), the communication control apparatus 10B is a communication destination (space B), and data is transmitted and received via the processing server 30.

As illustrated in FIG. 16, first, the communication control apparatus 10A makes a call of a connection destination for the communication control apparatus 10B (step S103). Upon receiving connection permission from the communication control apparatus 10B (step S106), the communication control apparatus 10A establishes a session (step S109).

Next, the communication control apparatus 10A acquires space information through the space information acquisition unit 102 (step S112), and determines the state of the user A and the state of the space A through the state determination unit 103 (step S115).

Next, the communication control apparatus 10A transmits the space information and the state information from the communication unit 107 to the communication control apparatus 10B (step S118).

Meanwhile, similarly, the communication control apparatus 10B side also acquires space information (step S121) and determines the state of the user B and the state of the space B (step S124).The communication control apparatus 10B side transmits the various kinds of information to the communication control apparatus 10A (step S127).

Next, the communication control apparatus 10A calculates the connection request level of the user A through the spatial distance control unit 104 (step S130), and transmits the connection request level to the processing server 30 (step S133). The connection request level of the user A may be what is optionally input by the user A, or may be calculated on the basis of a determination result of the state of the user or the state of the space.

Next, the communication control apparatus 10B side similarly calculates the connection request level of the user B through the spatial distance control unit 104 (step S136), and transmits the connection request level to the processing server 30 (step S139).

Next, the processing server 30 adjusts the distance on the basis of the connection request level of the user A and the connection request level of the user B (step S142). That is, the processing server 30 calculates an optimum connection degree on the basis of the connection request level of the user A and the connection request level of the user B. The connection degree can be calculated with the formula 2 described above with reference to FIG. 5.

Next, the processing server 30 transmits the calculated distance to each of the communication control apparatuses 10A and 10B (steps S145 and S148).

Next, the communication control apparatuses 10A and 10B use the spatial distance control units 104 to optimally control the spatial distance (steps S151 and S154). Specifically, the spatial distance control unit 104 sets the distance transmitted from the processing server 30 as spatial distance.

Next, the processing server 30 transmits the scene information to each of the communication control apparatuses 10A and 10B (steps S157 and S163). The transmitted scene information may be information of a scene selected by the user A or the user B, or information of a scene automatically decided by the processing server 30.

Next, the communication control apparatus 10A uses, through the 3D courtyard space generation unit 106, the scene information transmitted from the processing server 30, the space information received in step S127 above, the state determination information to generate a 3D courtyard space (step S160). In addition, in the case where relevant information (weather information, illuminance of the partner space, state of cookware, schedule information of the partner user, action history, and the like) is transmitted (step S169), the 3D courtyard space generation unit 106 also reflects the relevant information in the 3D courtyard space (step S172).

Meanwhile, similarly, the communication control apparatus 10B side also generates a 3D courtyard space (step S166), and reflects the received relevant information in the 3D courtyard space (steps S175 and S178).

Next, the communication control apparatus 10A presents the space information which is generated by the space information generation unit 108 and includes the 3D courtyard space, the partner space image (video of the space B) from the output unit (display or speaker) (step S181). Meanwhile, similarly, the communication control apparatus 10B side also presents the space information including a 3D courtyard space, and the partner space image (video of the space A) from the output unit (display or speaker) (step S184).

The 3D courtyard space and each partner space image described above can be synchronized by the processing server 30, and displayed on each display at the same timing with the same sense of distance.

Next, in the case where some information is updated (step S187/Yes), the communication control apparatus 10A repeats the processing from step S112. In addition, in the case where some information is updated (step S190/Yes), the communication control apparatus 10B also repeats the processing from step S121.

Then, once the communication control apparatus 10A is instructed to finish the connection (step S193/Yes), the communication control apparatus 10A checks with the communication control apparatus 10B whether to finish the connection (step S196). Upon receiving permission to finish the connection from the communication control apparatus 10B (step S199), the communication control apparatus 10A disconnects the session (step S202).

The above describes the communication control processing according to the present embodiment. Note that, here, as an example, synchronization processing is performed, an optimum connection degree is calculated, scene information is transmitted, and the like by the processing server 30. However, the present embodiment is not limited thereto. It is also possible for the communication control apparatus 10 to perform these kinds of processing.

<4-2. Scene Setting Processing>

Next, scene (3D space scene) setting processing will be described with reference to FIG. 18. As illustrated in FIG. 18, first, the processing server 30 transmits (presents) scene candidates to the communication control apparatus 10A (step S303).

Next, the communication control apparatus 10A displays the received scene candidates on the display, and receives a selection of the user A (step S306). Next, the selected scene is a pay scene (step S309/Yes), charging processing is performed in the processing server 30 (step S312).

Next, the processing server 30 transmits (presents) object candidates that are disposed in a 3D courtyard space to the communication control apparatus 10A (step S315).

Next, the communication control apparatus 10A disposes an object in the 3D courtyard space (step S318). The communication control apparatus 10A may then let the user A optionally select an object to be disposed.

Next, the disposed object is a pay object (step S321/Yes), charging processing is performed in the processing server 30 (step S324).

The scene setting terminates here. Note that, as an example, the case has been described here where the user A, who operates the communication control apparatus 10A, sets a scene which is shared with a communication partner. However, the present embodiment is not limited thereto. A plurality of users may set a scene together.

Next, the application of the set scene will be described. Once the communication control apparatus 10A uses the space information acquisition unit 102 to acquire space information (step S327), the communication control apparatus 10A associates the space information with a scene (step S330). Specifically, the communication control apparatus 10A reflects the space information in a scene or disposes the space information of a communication partner in a scene.

Next, when the communication control apparatus 10A acquires relevant service information (step S333), the communication control apparatus 10A associates the relevant information with the scene (step S336). Specifically, the communication control apparatus 10A reflects the relevant information in the scene.

«5. Applied Example»

Next, an applied example of the present embodiment will be described with reference to FIGS. 19 to 21.

Figure 19:
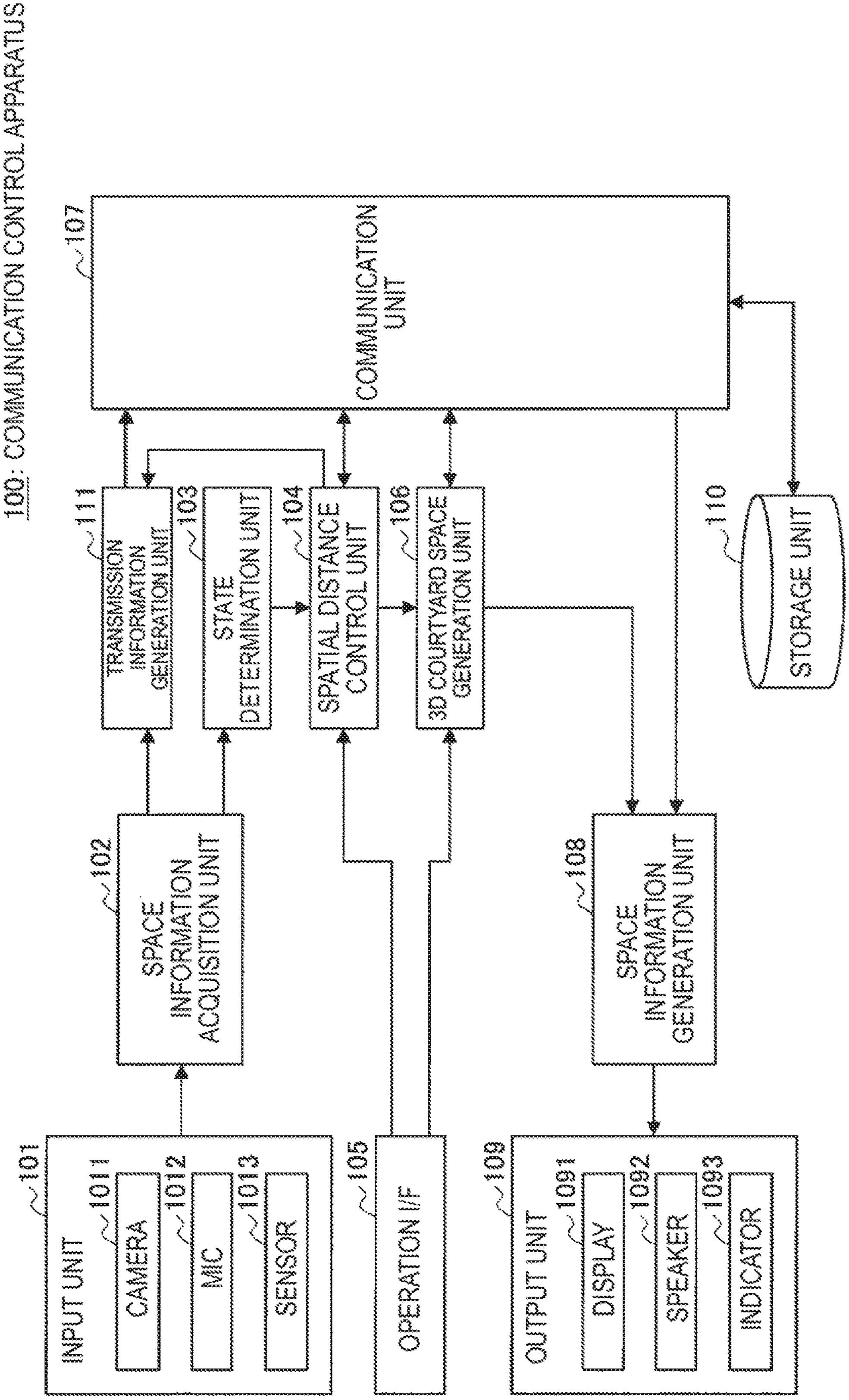
FIG. 19 is a block diagram illustrating an example of the configuration of a communication control apparatus according to an applied example of the present embodiment.

FIG. 19 is a block diagram illustrating an example of the configuration of a communication control apparatus 100 according to the applied example of the present embodiment. As illustrated in FIG. 19, the communication control apparatus 100 includes the input unit 101, the space information acquisition unit 102, the state determination unit 103, the spatial distance control unit 104, the operation interface (I/F) 105, the 3D courtyard space generation unit 106, the communication unit 107, the space information generation unit 108, the output unit 109, the storage unit 110, and a transmission information generation unit 111.

The configuration of the communication control apparatus 100 is different from that of the communication control apparatus 10 according to the present embodiment, which is described with reference to FIG. 2, in that the communication control apparatus 100 further includes the transmission information generation unit 111. Different points from those of the communication control apparatus 10 will be therefore described chiefly here. The other description of the configuration is similar to the description made with reference to FIG. 2, and will be thus omitted.

The transmission information generation unit 111 is capable of adjusting the amount of data transmitted to a communication destination via the communication unit 107. The transmission information generation unit 111 is capable of reducing communication cost by compressing the video of the space of a communication source side which is captured by the camera 1011 into video of low resolution in accordance with the length of the distance corresponding to the optimum connection degree set by the spatial distance control unit 104 in the case where low resolution will do, transmitting the compressed video, and the like.

For example, in the case where the distance corresponding to the optimum connection degree is an interval of 10 m, the transmission information generation unit 111 compresses video of HD resolution which is to be transmitted to a communication destination into video of quarter video graphics array (QVGA) resolution (i.e., decreases the resolution).

In addition, in the case where display is performed by performing time integration (long-term exposure) in the communication destination, transmission may be performed, for example, with the frame rate decreased from 60 fps to 5 fps.

In addition, the optimum connection degree is updated. Accordingly, for example, the transmission information generation unit 111 may perform transmission with QVGA resolution increased to video graphics array (VGA) resolution in the case where the connection degree becomes stronger (in the case where the distance becomes shorter). In addition, in the case where a plurality of partner space images are disposed in a three-dimensional space, and an image of a partner space X on one of the sides comes closer (i.e., the connection degree with the communication destination on the one of the sides becomes stronger), the transmission information generation unit 111 may perform control such that video to be transmitted to the communication destination on the one of the sides is increased from QVGA resolution to VGA resolution. In addition, in the case where an image of a partner space Y on the other side is visible because the partner space image on the one of the sides comes closer, this side is also visible from the partner space on the other side through the partner space X. Accordingly, the transmission information generation unit 111 may stop the transmission of video.

Figure 20:
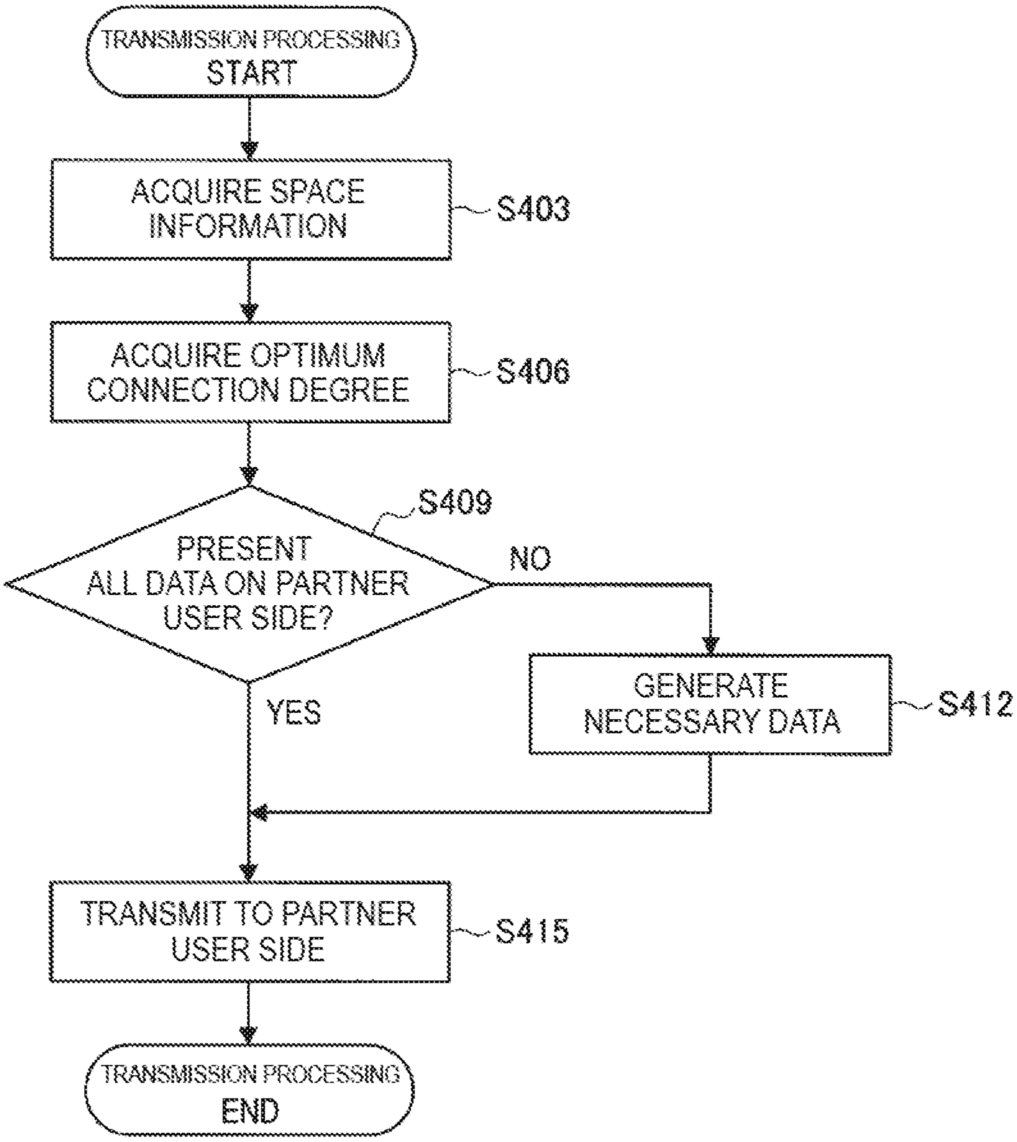
FIG. 20 is a flowchart illustrating transmission processing according to the applied example.

FIG. 20 is a flowchart illustrating transmission processing according to the applied example. As illustrated in FIG. 20, first, the transmission information generation unit 111 of the communication control apparatus 100 acquires space information from the space information acquisition unit 102 (step S403), and acquires an optimum connection degree from the spatial distance control unit 104 (step S406).

Next, the transmission information generation unit 111 determines on the basis of a partner user and an adjusted optimum connection degree whether or not all the data is presented on the partner user side (step S409). For example, in the case where the distance corresponding to the optimum connection degree is less than or equal to a predetermined threshold, the transmission information generation unit 111 determines that all the data is presented on the partner user side.

Next, in the case where all the data is not presented on the partner user side (step S409/No), the transmission information generation unit 111 generates (minimum) data necessary to present data on the partner user side (step S412). For example, the transmission information generation unit 111 decreases resolution or reduces an image.

Then, in the case where all the data is presented on the partner user side (step S409/Yes), the communication unit 107 transmits all the data to the partner user side, while, in the case where all the data is not presented, the communication unit 107 transmits the necessary data generated by the transmission information generation unit 111 to the partner user side (step S415).

In the example described above, it has been described that it is determined in accordance with the distance (interval)

corresponding to the optimum connection degree whether or not data is compressed. However, the present embodiment is not limited thereto. For example, in the case where the optimum connection degree includes "clearness" and the clearness is less than or equal to a predetermined threshold, data may be similarly compressed.

Figure 21:
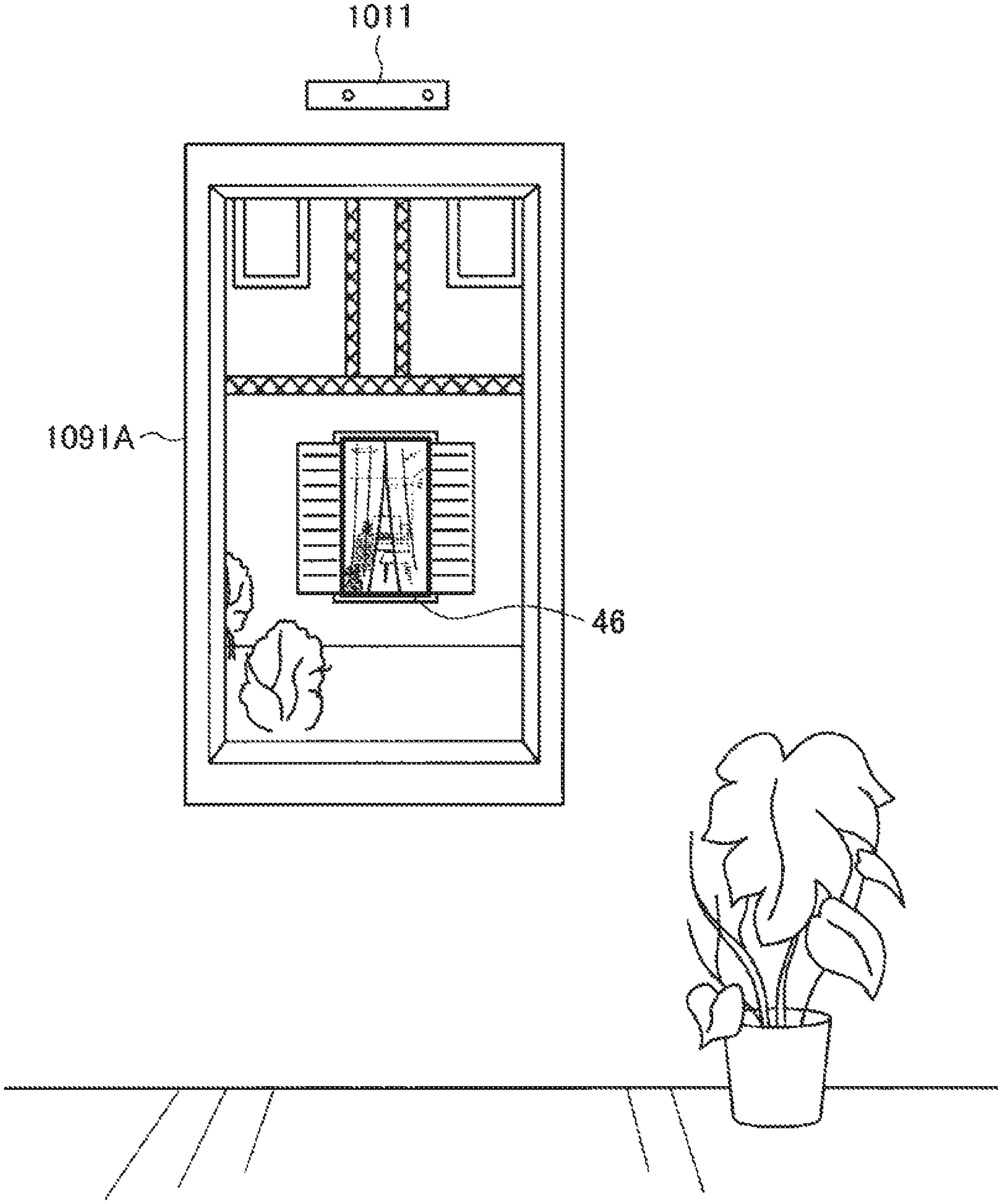
FIG. 21 is a diagram that describes that a partner space image is displayed in accordance with clearness according to the applied example.

FIG. 21 is a diagram that describes that a partner space image 46 is displayed in accordance with clearness. In addition to control over distance in a three-dimensional space, it is also possible to adjust the realization of a connection degree in accordance with the clearness of the displayed video of a partner space. It is possible to decrease the connection degree for even the same separation distance by editing the partner space image 46 such that the partner space image 46 is blocked somewhat by a curtain, for example, as illustrated in FIG. 21. The blocked state is synchronized in a communication source and a communication destination. Accordingly, the transmission information generation unit 111 edits video to be transmitted to the partner side such that the video is blocked, and makes it possible to reduce the amount of data and protect privacy. In addition, the adjustment of the clearness of video is not limited to video through a curtain. For example, an adjustment may be made in video that shows the silhouette of a partner through window, or video that clearly displays only the inside (stationary objects) of the room of the partner and displays moving persons in a transmissive manner by performing time integration (long-term exposure).

CONCLUSION

As described above, an information processing system according to an embodiment of the present disclosure makes it possible to produce the distance to a communication partner by using a three-dimensional expression to connect spaces, and realize more comfortable communication.

Specifically, a display installed in the space of a communication source is regarded as a window (or a door), and a space image in which the video of the space of a communication partner is disposed is displayed in a place having predetermined distance in a three-dimensional space, thereby making it possible to visually express the distance to the communication partner. Note that the aspect ratio of the display installed on the wall may be implemented in accordance with the dimensions of an actual window or door. In addition, in the case where a display is regarded as a door, the display is disposed such that the lower side of the display is positioned near the floor, thereby making possible to express the presence of the space over the door more realistically.

In addition, control may be performed such that the aspect ratio of the display area of the video of the space of a communication partner which is disposed in a three-dimensional space is the same as the aspect ratio of the display.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing the above-described communication control apparatus 10, or the hardware such as a central processing unit (CPU), a read only memory (ROM), and a random access memory (RAM) built in the processing server 30 to execute the functions of the communication control apparatus 10 or the processing server 30. In addition, there is also provided a computer-readable storage medium having the computer program stored therein.

In addition, in the above-described embodiment, the case has been described where the display 1091 is installed on the wall. However, the present embodiment is not limited thereto. A display unit provided to an information processing terminal may be used as the display 1091. In addition, for example, the display unit of a transmissive or non-transmissive head mounted display (HMD) may be used as the display 1091.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a reception unit configured to receive data from a communication destination;

a generation unit configured to generate space image information in which an image corresponding to a space of the communication destination is disposed at a predetermined position in a three-dimensional space; and a display control unit configured to perform control such that the generated space image information is displayed on a display unit in a communication source.

(2)

The information processing apparatus according to (1), further including:

a distance control unit configured to control virtual separation distance between the communication source and the communication destination in the three-dimensional space, in which the generation unit disposes the image corresponding to the space of the communication destination at a position corresponding to the separation distance adjusted by the distance control unit.

(3)

The information processing apparatus according to (2), in which the distance control unit controls the separation distance on a basis of a connection request level from the communication source and a connection request level from the communication destination.

(4)

The information processing apparatus according to (2) or (3), in which the distance control unit controls the separation distance on a basis of a context of a communication source user determined on a basis of space information of the communication source, and a context of a communication destination user determined on a basis of space information of the communication destination.

(5)

The information processing apparatus according to (4), in which the context includes at least any of a state of a user, a state of a real space in which a user is present, time, a season, weather, a place, and a relationship with a partner user.

(6)

The information processing apparatus according to any one of (1) to (5), in which the image corresponding to the space of the communication destination disposed in the three-dimensional space is generated on a basis of a captured image showing an inside of the space of the communication destination, the captured image being received from the communication destination.

(7)

The information processing apparatus according to (6), in which the generation unit further uses relevant information relevant to the space of the communication destination to generate the space image information.

(8)

The information processing apparatus according to (7), in which the relevant information includes at least weather information of the communication destination, illuminance of the space of the communication destination, a state of cookware, schedule information of a user of the communication destination, or an action history.

(9)

The information processing apparatus according to any one of (6) to (8), in which the generation unit generates the space image information in which the image corresponding to the space of the communication destination is disposed in a window area or a door area of a virtual building or a virtual mobile object disposed in the three-dimensional space.

(10)

The information processing apparatus according to any one of (6) to (9), in which the generation unit generates the space image information on a basis of real-time information of the space of the communication destination.

(11)

The information processing apparatus according to any one of (1) to (10), in which the display control unit controls the space image information to be displayed on the display unit such that movement of a viewpoint of a user is followed.

(12)

The information processing apparatus according to any one of (1) to (11), in which the generation unit generates a three-dimensional space in which a set predetermined scene is reflected.

(13)

The information processing apparatus according to any one of (1) to (12), in which the display control unit causes information acquired from the communication source or the communication destination to be reflected in an object displayed in a space in front of a position at which the image corresponding to the space of the communication destination is disposed.

(14)

The information processing apparatus according to any one of (1) to (13), in which the generation unit generates the space image information in which an object generated on a basis of the image corresponding to the space of the communication destination is disposed in a space in front of a position at which the image corresponding to the space of the communication destination is disposed.

(15)

The information processing apparatus according to (2), further including:

a data generation unit configured to generate data to be transmitted to the communication destination in accordance with the virtual separation distance on a basis of data acquired from a space of the communication source.

(16)

The information processing apparatus according to any one of (1) to (15), in which the information processing apparatus performs control such that display of the image corresponding to the space of the communication destination is synchronized with display of an image corresponding to a space of the communication source in the space of the communication destination.

(17)

An information processing method including, by a processor:

receiving data from a communication destination;

generating space image information in which an image corresponding to a space of the communication destination is disposed at a predetermined position in a three-dimensional space; and performing control such that the generated space image information is displayed on a display unit in a communication source.

(18)

A program for causing a computer to function as:

a reception unit configured to receive data from a communication destination;

a generation unit configured to generate space image information in which an image corresponding to a space of the communication destination is disposed at a predetermined position in a three-dimensional space; and a display control unit configured to perform control such that the generated space image information is displayed on a display unit in a communication source.

REFERENCE SIGNS LIST

1 telepresence system
10 (10A to 10C) communication control apparatus
20 network
30 processing server
40 window frame
41 partner space image
41' partner space image
100 communication control apparatus
101 input unit
1011 camera
1012 MIC
1013 sensor
102 space information acquisition unit
103 state determination unit
104 spatial distance control unit
105 operation I/F
106 courtyard space generation unit
107 communication unit
108 space information generation unit
109 output unit
1091 display
1092 speaker
1093 indicator
110 storage unit
111 transmission information generation unit

The invention claimed is:

1. An information processing apparatus comprising:

a reception unit configured to receive data from a communication destination;

a generation unit configured to generate space image information in which an image corresponding to a space of the communication destination is disposed at a predetermined position in a three-dimensional space;

a distance control unit configured to control a virtual separation distance between the communication source and the communication destination in the three-dimensional space, wherein the generation unit is configured to dispose the image corresponding to the space of the communication destination at a position corresponding to the separation distance; and a display control unit configured to perform control such that the generated space image information is displayed on a display unit in a communication source.

2. The information processing apparatus according to claim 1, wherein the distance control unit controls the separation distance on a basis of a connection request level from the communication source and a connection request level from the communication destination.

3. The information processing apparatus according to claim 1, wherein the distance control unit controls the separation distance on a basis of a context of a communication source user determined on a basis of space information of the communication source, and a context of a communication destination user determined on a basis of space information of the communication destination.

4. The information processing apparatus according to claim 3, wherein the context includes at least any of a state of a user, a state of a real space in which a user is present, time, a season, weather, a place, and a relationship with a partner user.

5. The information processing apparatus according to claim 1, wherein the image corresponding to the space of the communication destination disposed in the three-dimensional space is generated on a basis of a captured image showing an inside of the space of the communication destination, the captured image being received from the communication destination.

6. The information processing apparatus according to claim 5, wherein the generation unit further uses relevant information relevant to the space of the communication destination to generate the space image information.

7. The information processing apparatus according to claim 6, wherein the relevant information includes at least weather information of the communication destination, illuminance of the space of the communication destination, a state of cookware, schedule information of a user of the communication destination, or an action history.

8. The information processing apparatus according to claim 5, wherein the generation unit generates the space image information in which the image corresponding to the space of the communication destination is disposed in a window area or a door area of a virtual building or a virtual mobile object disposed in the three-dimensional space.

9. The information processing apparatus according to claim 5, wherein the generation unit generates the space image information on a basis of real-time information of the space of the communication destination.

10. The information processing apparatus according to claim 1, wherein the display control unit controls the space image information to be displayed on the display unit such that movement of a viewpoint of a user is followed.

11. The information processing apparatus according to claim 1, wherein the generation unit generates a three-dimensional space in which a set predetermined scene is reflected.

12. The information processing apparatus according to claim 1, wherein the display control unit causes information acquired from the communication source or the communication destination to be reflected in an object displayed in a space in front of a position at which the image corresponding to the space of the communication destination is disposed.

13. The information processing apparatus according to claim 1, wherein the generation unit generates the space image information in which an object generated on a basis of the image corresponding to the space of the communication destination is disposed in a space in front of a position at which the image corresponding to the space of the communication destination is disposed.

14. The information processing apparatus according to claim 1, further comprising:

a data generation unit configured to generate data to be transmitted to the communication destination in accordance with the virtual separation distance on a basis of data acquired from a space of the communication source.

15. The information processing apparatus according to claim 1, wherein the information processing apparatus performs control such that display of the image corresponding to the space of the communication destination is synchronized with display of an image corresponding to a space of the communication source in the space of the communication destination.

16. An information processing method comprising, by a processor:

receiving data from a communication destination;

generating space image information in which an image corresponding to a space of the communication destination is disposed at a predetermined position in a three-dimensional space;

controlling a virtual separation distance between the communication source and the communication destination in the three-dimensional space;

disposing the image corresponding to the space of the communication destination at a position corresponding to the separation distance and performing control such that the generated space image information is displayed on a display unit in a communication source.

17. A non-transitory computer readable storage medium comprising a program for causing a computer to function as:

a reception unit configured to receive data from a communication destination;

a generation unit configured to generate space image information in which an image corresponding to a space of the communication destination is disposed at a predetermined position in a three-dimensional space;

a distance control unit configured to control a virtual separation distance between the communication source and the communication destination in the three-dimensional space, wherein the generation unit is configured to dispose the image corresponding to the space of the communication destination at a position corresponding to the separation distance; and a display control unit configured to perform control such that the generated space image information is displayed on a display unit in a communication source.

* * * * *